United States Patent
Xia et al.

(10) Patent No.: US 12,482,539 B2
(45) Date of Patent: Nov. 25, 2025

(54) ROBUSTNESS OF HYDROLASES BY COMBINING HIGH-PRESSURE MOLECULAR DYNAMICS SIMULATION AND FREE ENERGY CALCULATION

(71) Applicant: Jiangnan University, Wuxi (CN)

(72) Inventors: Xiaole Xia, Wuxi (CN); Nan Zheng, Wuxi (CN); Zehua Zhang, Wuxi (CN)

(73) Assignee: Jiangnan University, Wuxi (CN)

( * ) Notice: Subject to any disclaimer, the term of this patent is extended or adjusted under 35 U.S.C. 154(b) by 1240 days.

(21) Appl. No.: 17/308,106

(22) Filed: May 5, 2021

(65) Prior Publication Data

US 2021/0257057 A1 Aug. 19, 2021

(30) Foreign Application Priority Data

Dec. 24, 2020 (CN) .......................... 202011551804.2

(51) Int. Cl.
*G16B 40/00* (2019.01)
*G16B 5/20* (2019.01)

(52) U.S. Cl.
CPC ............... *G16B 40/00* (2019.02); *G16B 5/20* (2019.02)

(58) Field of Classification Search
CPC .......... G16B 40/00; G16B 5/20; G16B 15/20; G16B 20/50; G16B 15/00; G16C 10/00; C12N 9/20; C12N 9/80; C12Y 301/01003; C12Y 305/01075
See application file for complete search history.

(56) References Cited

FOREIGN PATENT DOCUMENTS

CN 105950585 A * 9/2016 ............... C12N 9/20

OTHER PUBLICATIONS

Kikani BA et al. (2015) Enzyme stability, thermodynamics and secondary structures of α-amylase as probed by the CD spectroscopy. International Journal of Biological Macromolecules, vol. 81:450-460; https://doi.org/10.1016/j.ijbiomac.2015.08.032. (Year: 2015).*
Abedi Karjiban, R., Lim, W.Z., Basri, M. et al. (2014) Molecular Dynamics of Thermoenzymes at High Temperature and Pressure: A Review. Protein J 33, 369-376 . https://doi.org/10.1007/s10930-014-9568-8 (Year: 2014).*
Eisenmenger MJ et al. (2009) High pressure enhancement of enzymes: A review, Enzyme and Microbial Technology. vol. 45(5):331-347 https://doi.org/10.1016/j.enzmictec.2009.08.001. (Year: 2009).*
Li et al. (2012) The effect of thermostabilising mutations on the pressure stability of Trichoderma reesei GH11 xylanase. Protein Engineering, Design & Selection 25.12: 821-826. (Year: 2012).*
Zheng H et al (2010) Manipulating the stereoselectivity of limonene epoxide hydrolase by directed evolution based on iterative saturation mutagenesis. Journal of the American Chemical Society 132. 44: 15744-15751. (Year: 2010).*

* cited by examiner

*Primary Examiner* — Mary K Zeman
*Assistant Examiner* — Vy Rossi
(74) *Attorney, Agent, or Firm* — IPro, PLLC; Na Xu

(57) ABSTRACT

Described is a method for screening hydrolases with improved robustness by combining high-pressure molecular dynamics simulation and free energy calculation. The disclosed methods belongs to the fields of computational chemistry, bioinformatics, genetic engineering, and protein engineering, where the above method constructs and screens hydrolase mutants. The frequency of positive mutants in the screen is as high as 62.5%, meaning that the screening workload is effectively reduced, and the obtained mutants have high robustness and high industrial application potential.

3 Claims, 6 Drawing Sheets

Specification includes a Sequence Listing.

SEQUENCE LISTING

<160> NUMBER OF SEQ ID NOS: 75

<210> SEQ ID NO 1
<211> LENGTH: 416
<212> TYPE: PRT
<213> ORGANISM: Geobacillus zalihae strain T1

```
<400> SEQUENCE: 1

Met Lys Cys Cys Arg Ile Met Phe Val Leu Leu Gly Leu Trp Phe Val
1               5                   10                  15

Phe Gly Leu Ser Val Pro Gly Gly Arg Thr Glu Ala Ala Ser Leu Arg
            20                  25                  30

Ala Asn Asp Ala Pro Ile Val Leu Leu His Gly Phe Thr Gly Trp Gly
            35                  40                  45

Arg Glu Glu Met Phe Gly Phe Lys Tyr Trp Gly Gly Val Arg Gly Asp
        50                  55                  60

Ile Glu Gln Trp Leu Asn Asp Asn Gly Tyr Arg Thr Tyr Thr Leu Ala
65                  70                  75                  80

Val Gly Pro Leu Ser Ser Asn Trp Asp Arg Ala Cys Glu Ala Tyr Ala
                85                  90                  95

Gln Leu Val Gly Gly Thr Val Asp Tyr Gly Ala His Ala Ala Lys
            100                 105                 110

His Gly His Ala Arg Phe Gly Arg Thr Tyr Pro Gly Leu Leu Pro Glu
            115                 120                 125

Leu Lys Arg Gly Gly Arg Ile His Ile Ile Ala His Ser Gln Gly Gly
        130                 135                 140

Gln Thr Ala Arg Met Leu Val Ser Leu Leu Glu Asn Gly Ser Gln Glu
145                 150                 155                 160

Glu Arg Glu Tyr Ala Lys Ala His Asn Val Ser Leu Ser Pro Leu Phe
                165                 170                 175

Glu Gly Gly His His Phe Val Leu Ser Val Thr Thr Ile Ala Thr Pro
            180                 185                 190

His Asp Gly Thr Thr Leu Val Asn Met Val Asp Phe Thr Asp Arg Phe
            195                 200                 205

Phe Asp Leu Gln Lys Ala Val Leu Glu Ala Ala Val Ala Ser Asn
210                 215                 220

Val Pro Tyr Thr Ser Gln Val Tyr Asp Phe Lys Leu Asp Gln Trp Gly
225                 230                 235                 240

Leu Arg Arg Gln Pro Gly Glu Ser Phe Asp His Tyr Phe Glu Arg Leu
            245                 250                 255

Lys Arg Ser Pro Val Trp Thr Ser Thr Asp Thr Ala Arg Tyr Asp Leu
            260                 265                 270

Ser Val Ser Gly Ala Glu Lys Leu Asn Gln Trp Val Gln Ala Ser Pro
        275                 280                 285

Asn Thr Tyr Tyr Leu Ser Phe Ser Thr Glu Arg Thr Tyr Arg Gly Ala
        290                 295                 300

Leu Thr Gly Asn His Tyr Pro Glu Leu Gly Met Asn Ala Phe Ser Ala
305                 310                 315                 320

Val Val Cys Ala Pro Phe Leu Gly Ser Tyr Arg Asn Pro Thr Leu Gly
                325                 330                 335

Ile Asp Asp Arg Trp Leu Glu Asn Asp Gly Ile Val Asn Thr Val Ser
            340                 345                 350

Met Asn Gly Pro Lys Arg Gly Ser Ser Asp Arg Ile Val Pro Tyr Asp
            355                 360                 365

Gly Thr Leu Lys Lys Gly Val Trp Asn Asp Met Gly Thr Tyr Asn Val
            370                 375                 380

Asp His Leu Glu Ile Ile Gly Val Asp Pro Asn Pro Ser Phe Asp Ile
385                 390                 395                 400

Arg Ala Phe Tyr Leu Arg Leu Ala Glu Gln Leu Ala Ser Leu Gln Pro
```

|           |           |           |
|-----------|-----------|-----------|
|    405    |    410    |    415    |

```
<210> SEQ ID NO 2
<211> LENGTH: 340
<212> TYPE: PRT
<213> ORGANISM: Rhizomucor miehei

<400> SEQUENCE: 2

Met Val Pro Ile Lys Arg Gln Ser Asn Ser Thr Val Asp Ser Leu Pro
1               5                  10                  15

Pro Leu Ile Pro Ser Arg Thr Ser Ala Pro Ser Ser Ser Pro Ser Thr
            20                  25                  30

Thr Asp Pro Glu Ala Pro Ala Met Ser Arg Asn Gly Pro Leu Pro Ser
        35                  40                  45

Asp Val Glu Thr Lys Tyr Gly Met Ala Leu Asn Ala Thr Ser Tyr Pro
    50                  55                  60

Asp Ser Val Val Gln Ala Met Ser Ile Asp Gly Gly Ile Arg Ala Ala
65                  70                  75                  80

Thr Ser Gln Glu Ile Asn Glu Leu Thr Tyr Tyr Thr Leu Ser Ala
                85                  90                  95

Asn Ser Tyr Cys Arg Thr Val Ile Pro Gly Ala Thr Trp Asp Cys Ile
            100                 105                 110

His Cys Asp Ala Thr Glu Asp Leu Lys Ile Ile Lys Thr Trp Ser Thr
        115                 120                 125

Leu Ile Tyr Asp Thr Asn Ala Met Val Ala Arg Gly Asp Ser Glu Lys
    130                 135                 140

Thr Ile Tyr Ile Val Phe Arg Gly Ser Ser Ser Ile Arg Asn Trp Ile
145                 150                 155                 160

Ala Asp Leu Thr Phe Val Pro Val Ser Tyr Pro Pro Val Ser Gly Thr
                165                 170                 175

Lys Val His Lys Gly Phe Leu Asp Ser Tyr Gly Glu Val Gln Asn Glu
            180                 185                 190

Leu Val Ala Thr Val Leu Asp Gln Phe Lys Gln Tyr Pro Ser Tyr Lys
        195                 200                 205

Val Ala Val Thr Gly His Ser Leu Gly Gly Ala Thr Ala Leu Leu Cys
    210                 215                 220

Ala Leu Asp Leu Tyr Gln Arg Glu Glu Gly Leu Ser Ser Ser Asn Leu
225                 230                 235                 240

Phe Leu Tyr Thr Gln Gly Gln Pro Arg Val Gly Asp Pro Ala Phe Ala
                245                 250                 255

Asn Tyr Val Val Ser Thr Gly Ile Pro Tyr Arg Arg Thr Val Asn Glu
            260                 265                 270

Arg Asp Ile Val Pro His Leu Pro Pro Ala Ala Phe Gly Phe Leu His
        275                 280                 285

Ala Gly Glu Glu Tyr Trp Ile Thr Asp Asn Ser Pro Glu Thr Val Gln
    290                 295                 300

Val Cys Thr Ser Asp Leu Glu Thr Ser Asp Cys Ser Asn Ser Ile Val
305                 310                 315                 320

Pro Phe Thr Ser Val Leu Asp His Leu Ser Tyr Phe Gly Ile Asn Thr
                325                 330                 335

Gly Leu Cys Thr
            340

<210> SEQ ID NO 3
<211> LENGTH: 472
```

<212> TYPE: PRT
<213> ORGANISM: Lysinibacillus fusiformis SC02

<400> SEQUENCE: 3

```
Met Thr Thr Asp Leu His Leu Lys Ser Val Glu Glu Leu Ala Pro Leu
1               5                   10                  15

Leu Ala Ser Lys Ser Leu Ser Pro Val Glu Leu Thr Lys Ala Ile Leu
            20                  25                  30

Asp Phe Ala Glu Glu Ser Gln Pro Lys Ile Asn Ser Tyr Met Ala Phe
        35                  40                  45

Tyr Arg Glu Glu Ala Leu Ala Arg Ala Lys Glu Val Glu Gln Glu Ile
    50                  55                  60

Leu Gln Gly His Tyr Lys Gly Met Tyr His Gly Ile Pro Met Ala Leu
65                  70                  75                  80

Lys Asp Asn Leu Tyr Phe Lys Asp Lys Ile Thr Thr Met Ser Ser Lys
                85                  90                  95

Ile His Lys Asp Phe Val Ser Asp Tyr Asp Ala Thr Val Val Glu Lys
            100                 105                 110

Leu Arg Asp Ala Gly Val Ile Phe Thr Gly Lys Leu Ser Met His Glu
        115                 120                 125

Tyr Ala Trp Gly Ile Thr Asn Asn Asn Pro His Tyr Gly Pro Val Arg
    130                 135                 140

Asn Pro Trp Asp Leu Asp Lys Ile Pro Gly Gly Ser Ser Gly Gly Ser
145                 150                 155                 160

Gly Ala Ala Val Ala Ala Gly Ala Ser Val Ala Ser Leu Gly Thr Asp
                165                 170                 175

Thr Ala Gly Ser Ile Arg Ile Pro Ser Ser Ala Cys Gly Ile Val Gly
            180                 185                 190

Leu Lys Pro Thr His Gly Arg Val Ser Lys Tyr Gly Cys Tyr Pro Leu
        195                 200                 205

Ala Trp Ser Leu Asp His Ile Gly Pro Met Thr Lys Thr Val Lys Asp
    210                 215                 220

Ala Ala Gly Leu Leu Glu Val Ile Ala Gly Phe Asp His Gln Asp Pro
225                 230                 235                 240

Thr Cys Val Asn Val Pro Val Asp Asn Tyr Glu Lys Gln Leu Thr Gly
                245                 250                 255

Asn Ile Lys Asp Leu Val Ile Gly Ile Asn Glu Glu Tyr Phe Phe Asn
            260                 265                 270

Asn Val Asp Ala Asp Val Glu Lys Ala Val Arg Ala Ser Ile Gln Ser
        275                 280                 285

Leu Val Asp Ser Gly Ala Lys Val Glu Val Val Arg Ile Pro Ser Leu
    290                 295                 300

Gln Tyr Ala Glu Trp Ala Glu Leu Val Thr Ser Leu Ser Glu Ala Ala
305                 310                 315                 320

Ala Ile His His Ser Asp Leu Gln Lys Arg Pro Gln Asp Phe Gly Asp
                325                 330                 335

Asp Ile Arg Leu Leu Phe Glu Leu Gly Glu Leu Pro Ser Ala Val Asp
            340                 345                 350

Tyr Leu Gln Ala Gln Gln Val Arg Arg Gln Ile Lys Gln Glu Phe Thr
        355                 360                 365

Glu Ile Phe Asn Lys Val Asp Val Leu Ile Ser Pro Thr Leu Pro Ile
    370                 375                 380

Val Ala Ser Thr Ile Gly Asp Asp Phe Ala Glu Leu Asn Gly Gln Lys
385                 390                 395                 400
```

```
Val Asp Leu Ile Asp Asn Ile Ile Arg Phe Thr Gly Pro Ser Asn Leu
            405                 410                 415
Thr Gly Leu Pro Ala Leu Ser Val Pro Cys Gly Phe Lys Gly Asn Leu
        420                 425                 430
Pro Ile Gly Leu Gln Ile Ile Gly Pro Ala Phe Lys Glu Gly Arg Ile
            435                 440                 445
Leu Asn Val Gly Tyr Ala Val Glu Gln Ala Asn Pro Gln Arg Asn Arg
    450                 455                 460
Lys Pro Asn Ile Phe Ala Asn Ile
465                 470

<210> SEQ ID NO 4
<211> LENGTH: 35
<212> TYPE: DNA
<213> ORGANISM: Artificial sequence
<220> FEATURE:
<223> OTHER INFORMATION: Synthetic DNA sequence

<400> SEQUENCE: 4
ttgatctgat caaagcagtg ttagaagcag ccgcc                              35

<210> SEQ ID NO 5
<211> LENGTH: 32
<212> TYPE: DNA
<213> ORGANISM: Artificial sequence
<220> FEATURE:
<223> OTHER INFORMATION: Synthetic DNA sequence

<400> SEQUENCE: 5
cactgctttc atcagatcaa aaagcgatc gg                                  32

<210> SEQ ID NO 6
<211> LENGTH: 35
<212> TYPE: DNA
<213> ORGANISM: Artificial sequence
<220> FEATURE:
<223> OTHER INFORMATION: Synthetic DNA sequence

<400> SEQUENCE: 6
ttgatctgtt gaaagcagtg ttagaagcag ccgcc                              35

<210> SEQ ID NO 7
<211> LENGTH: 32
<212> TYPE: DNA
<213> ORGANISM: Artificial sequence
<220> FEATURE:
<223> OTHER INFORMATION: Synthetic DNA sequence

<400> SEQUENCE: 7
cactgctttc aacagatcaa aaagcgatc gg                                  32

<210> SEQ ID NO 8
<211> LENGTH: 35
<212> TYPE: DNA
<213> ORGANISM: Artificial sequence
<220> FEATURE:
<223> OTHER INFORMATION: Synthetic DNA sequence

<400> SEQUENCE: 8
ttgatctgat gaaagcagtg ttagaagcag ccgcc                              35

<210> SEQ ID NO 9
<211> LENGTH: 29
```

<212> TYPE: DNA
<213> ORGANISM: Artificial sequence
<220> FEATURE:
<223> OTHER INFORMATION: Synthetic DNA sequence

<400> SEQUENCE: 9
tgctttcatc agatcaaaaa agcgatcgg                                    29

<210> SEQ ID NO 10
<211> LENGTH: 35
<212> TYPE: DNA
<213> ORGANISM: Artificial sequence
<220> FEATURE:
<223> OTHER INFORMATION: Synthetic DNA sequence

<400> SEQUENCE: 10
ttgatctgta caaagcagtg ttagaagcag ccgcc                             35

<210> SEQ ID NO 11
<211> LENGTH: 29
<212> TYPE: DNA
<213> ORGANISM: Artificial sequence
<220> FEATURE:
<223> OTHER INFORMATION: Synthetic DNA sequence

<400> SEQUENCE: 11
tgctttgtac agatcaaaaa agcgatcgg                                    29

<210> SEQ ID NO 12
<211> LENGTH: 35
<212> TYPE: DNA
<213> ORGANISM: Artificial sequence
<220> FEATURE:
<223> OTHER INFORMATION: Synthetic DNA sequence

<400> SEQUENCE: 12
ttgatctggt taaagcagtg ttagaagcag ccgcc                             35

<210> SEQ ID NO 13
<211> LENGTH: 29
<212> TYPE: DNA
<213> ORGANISM: Artificial sequence
<220> FEATURE:
<223> OTHER INFORMATION: Synthetic DNA sequence

<400> SEQUENCE: 13
tgctttaacc agatcaaaaa agcgatcgg                                    29

<210> SEQ ID NO 14
<211> LENGTH: 35
<212> TYPE: DNA
<213> ORGANISM: Artificial sequence
<220> FEATURE:
<223> OTHER INFORMATION: Synthetic DNA sequence

<400> SEQUENCE: 14
ttgatctgtt taaagcagtg ttagaagcag ccgcc                             35

<210> SEQ ID NO 15
<211> LENGTH: 29
<212> TYPE: DNA
<213> ORGANISM: Artificial sequence
<220> FEATURE:
<223> OTHER INFORMATION: Synthetic DNA sequence

<400> SEQUENCE: 15

```
tgctttaaac agatcaaaaa agcgatcgg                              29

<210> SEQ ID NO 16
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 16
ttgatctgca gaaattagtg ttagaagcag ccgccgtg                    38

<210> SEQ ID NO 17
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 17
gctgcttcta acactaattt ctgcagatca aaaaagcg                    38

<210> SEQ ID NO 18
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 18
ttgatctgca gaaaaaggtg ttagaagcag ccgccgtg                    38

<210> SEQ ID NO 19
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 19
gctgcttcta acaccttttt ctgcagatca aaaaagcg                    38

<210> SEQ ID NO 20
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 20
ttgatctgca gaaacgtgtg ttagaagcag ccgccgtg                    38

<210> SEQ ID NO 21
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 21
gctgcttcta acacacgttt ctgcagatca aaaaagcg                    38

<210> SEQ ID NO 22
<211> LENGTH: 38
<212> TYPE: DNA
<213> ORGANISM: Artificial sequence
```

-continued

<220> FEATURE:
<223> OTHER INFORMATION: Synthetic DNA sequence

<400> SEQUENCE: 22
ttgatctgca gaaacaggtg ttagaagcag ccgccgtg                           38

<210> SEQ ID NO 23
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 23
gctgcttcta acacctgttt ctgcagatca aaaaagcg                           38

<210> SEQ ID NO 24
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 24
ttgatctgca gaaatacgtg ttagaagcag ccgccgtg                           38

<210> SEQ ID NO 25
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 25
gctgcttcta acacgtattt ctgcagatca aaaaagcg                           38

<210> SEQ ID NO 26
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 26
ttgatctgca gaaaatggtg ttagaagcag ccgccgtg                           38

<210> SEQ ID NO 27
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 27
gctgcttcta acacgatttt ctgcagatca aaaaagcg                           38

<210> SEQ ID NO 28
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 28
ttgatctgca gaaatttgtg ttagaagcag ccgccgtg                           38

<210> SEQ ID NO 29
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 29
gctgcttcta acacaaattt ctgcagatca aaaaagcg        38

<210> SEQ ID NO 30
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 30
ttgatctgca gaaatgggtg ttagaagcag ccgccgtg        38

<210> SEQ ID NO 31
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 31
gctgcttcta acacccattt ctgcagatca aaaaagcg        38

<210> SEQ ID NO 32
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 32
ttgatctgca gaaattattt ttagaagcag ccgccgtg        38

<210> SEQ ID NO 33
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 33
gctgcttcta aaaataattt ctgcagatca aaaaagcg        38

<210> SEQ ID NO 34
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 34
ttgatctgca gaaattatta ttagaagcag ccgccgtg        38

<210> SEQ ID NO 35
<211> LENGTH: 38
<212> TYPE: DNA
<213> ORGANISM: Artificial sequence
<220> FEATURE:
<223> OTHER INFORMATION: Synthetic DNA sequence -continued

<400> SEQUENCE: 35
gctgcttcta ataataattt ctgcagatca aaaaagcg                                    38

<210> SEQ ID NO 36
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 36
ttgatctgca gaaattatac ttagaagcag ccgccgtg                                    38

<210> SEQ ID NO 37
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 37
gctgcttcta agtataattt ctgcagatca aaaaagcg                                    38

<210> SEQ ID NO 38
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 38
ttgatctgca gaaagcaatg ttagaagcag ccgccgtg                                    38

<210> SEQ ID NO 39
<211> LENGTH: 38
<212> TYPE: DNA
<213> ORGANISM: Artificial sequence
<220> FEATURE:
<223> OTHER INFORMATION: Synthetic DNA sequence

<400> SEQUENCE: 39
gctgcttcta acattaattt ctgcagatca aaaaagcg                                    38

<210> SEQ ID NO 40
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 40
ctgcagaaag cagtgatgga agcagccgcc gtggca                                      36

<210> SEQ ID NO 41
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 41
tgccacggcg gctgcttcca tcactgcttt ctgcag                                      36

<210> SEQ ID NO 42

```
<211> LENGTH: 39
<212> TYPE: DNA
<213> ORGANISM: Artificial sequence
<220> FEATURE:
<223> OTHER INFORMATION: Synthetic DNA sequence

<400> SEQUENCE: 42
aaagcagtgt tagaactggc cgccgtggca agcaacgtg                                39

<210> SEQ ID NO 43
<211> LENGTH: 39
<212> TYPE: DNA
<213> ORGANISM: Artificial sequence
<220> FEATURE:
<223> OTHER INFORMATION: Synthetic DNA sequence

<400> SEQUENCE: 43
gcttgccacg gcggccagtt ctaacactgc tttctgcag                                39

<210> SEQ ID NO 44
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 44
cagaaagcag tgttagaata cgccgccgtg gcaagc                                   36

<210> SEQ ID NO 45
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 45
gcttgccacg gcggcgtatt ctaacactgc tttctg                                   36

<210> SEQ ID NO 46
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 46
cagaaagcag tgttagaaaa ggccgccgtg gcaagc                                   36

<210> SEQ ID NO 47
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 47
gcttgccacg gcggcctttt ctaacactgc tttctg                                   36

<210> SEQ ID NO 48
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 48
```
cagaaagcag tgttagaacg tgccgccgtg gcaagc						36

<210> SEQ ID NO 49
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 49
gcttgccacg gcggcacgtt ctaacactgc tttctg						36

<210> SEQ ID NO 50
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 50
cagaaagcag tgttagaaaa tgccgccgtg gcaagc						36

<210> SEQ ID NO 51
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 51
gcttgccacg gcggctaatt ctaacactgc tttctg						36

<210> SEQ ID NO 52
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 52
cagaaagcag tgttagaaat ggccgccgtg gcaagc						36

<210> SEQ ID NO 53
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 53
gcttgccacg gcggccattt ctaacactgc tttctg						36

<210> SEQ ID NO 54
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 54
cagaaagcag tgttagaatg ggccgccgtg gcaagc						36

<210> SEQ ID NO 55
<211> LENGTH: 36
<212> TYPE: DNA

<213> ORGANISM: Artificial sequence
<220> FEATURE:
<223> OTHER INFORMATION: Synthetic DNA sequence

<400> SEQUENCE: 55
gcttgccacg gcggcccatt ctaacactgc tttctg           36

<210> SEQ ID NO 56
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 56
cagaaagcag tgttagaaca tgccgccgtg gcaagc           36

<210> SEQ ID NO 57
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 57
gcttgccacg gcggcatgtt ctaacactgc tttctg           36

<210> SEQ ID NO 58
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 58
cagaaagcag tgttagaatt tgccgccgtg gcaagc           36

<210> SEQ ID NO 59
<211> LENGTH: 36
<212> TYPE: DNA
<213> ORGANISM: Artificial sequence
<220> FEATURE:
<223> OTHER INFORMATION: Synthetic DNA sequence

<400> SEQUENCE: 59
gcttgccacg gcggcaaatt ctaacactgc tttctg           36

<210> SEQ ID NO 60
<211> LENGTH: 30
<212> TYPE: DNA
<213> ORGANISM: Artificial sequence
<220> FEATURE:
<223> OTHER INFORMATION: Synthetic DNA sequence

<400> SEQUENCE: 60
gaactgacct acttcaccct gtctgcgaac           30

<210> SEQ ID NO 61
<211> LENGTH: 30
<212> TYPE: DNA
<213> ORGANISM: Artificial sequence
<220> FEATURE:
<223> OTHER INFORMATION: Synthetic DNA sequence

<400> SEQUENCE: 61
cagggtgaag taggtcagtt cgttgatttc           30

```
<210> SEQ ID NO 62
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 62
ctgacctact atgtgaccct gtctgcgaac agc                                   33

<210> SEQ ID NO 63
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 63
agacagggtc acatagtagg tcagttcgtt gat                                   33

<210> SEQ ID NO 64
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 64
tataccaccc tggccgcgaa cagctactgc cgt                                   33

<210> SEQ ID NO 65
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 65
gctgttcgcg gccagggtgg tatagtaggt cag                                   33

<210> SEQ ID NO 66
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 66
ctgggtggtg cgatcgctct gctgtgcgcg ctg                                   33

<210> SEQ ID NO 67
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 67
cagcagagcg atcgcaccac ccagagagtg gcc                                   33

<210> SEQ ID NO 68
<211> LENGTH: 33
<212> TYPE: DNA
<213> ORGANISM: Artificial sequence
<220> FEATURE:
```

<223> OTHER INFORMATION: Synthetic DNA sequence

<400> SEQUENCE: 68
ccgtaccgtc gtgtcgttaa cgaacgtgat atc                          33

<210> SEQ ID NO 69
<211> LENGTH: 33
<212> TYPE: DNA
<213> ORGANISM: Artificial sequence
<220> FEATURE:
<223> OTHER INFORMATION: Synthetic DNA sequence

<400> SEQUENCE: 69
ttcgttaacg acacgacggt acgggatacc ggt                          33

<210> SEQ ID NO 70
<211> LENGTH: 26
<212> TYPE: DNA
<213> ORGANISM: Artificial sequence
<220> FEATURE:
<223> OTHER INFORMATION: Synthetic DNA sequence

<400> SEQUENCE: 70
taaatctgaa tggtgtatag ctgctg                                  26

<210> SEQ ID NO 71
<211> LENGTH: 25
<212> TYPE: DNA
<213> ORGANISM: Artificial sequence
<220> FEATURE:
<223> OTHER INFORMATION: Synthetic DNA sequence

<400> SEQUENCE: 71
ctgaagagac cacaagattt tggtg                                   25

<210> SEQ ID NO 72
<211> LENGTH: 25
<212> TYPE: DNA
<213> ORGANISM: Artificial sequence
<220> FEATURE:
<223> OTHER INFORMATION: Synthetic DNA sequence

<400> SEQUENCE: 72
gcaaagagac cacaagattt tggtg                                   25

<210> SEQ ID NO 73
<211> LENGTH: 25
<212> TYPE: DNA
<213> ORGANISM: Artificial sequence
<220> FEATURE:
<223> OTHER INFORMATION: Synthetic DNA sequence

<400> SEQUENCE: 73
tataagagac cacaagattt tggtg                                   25

<210> SEQ ID NO 74
<211> LENGTH: 25
<212> TYPE: DNA
<213> ORGANISM: Artificial sequence
<220> FEATURE:
<223> OTHER INFORMATION: Synthetic DNA sequence

<400> SEQUENCE: 74
tgtaagagac cacaagattt tggtg                                   25

```
<210> SEQ ID NO 75
<211> LENGTH: 25
<212> TYPE: DNA
<213> ORGANISM: Artificial sequence
<220> FEATURE:
<223> OTHER INFORMATION: Synthetic DNA sequence

<400> SEQUENCE: 75
gttaagagac cacaagattt tggtg                                    25
```

ROBUSTNESS OF HYDROLASES BY COMBINING HIGH-PRESSURE MOLECULAR DYNAMICS SIMULATION AND FREE ENERGY CALCULATION

REFERENCE TO SEQUENCE LISTING

The instant application contains a Sequence Listing in TXT format as a file named "SEQ.txt," created on Apr. 13, 2021 of 24,924 bytes in size, and which is hereby incorporated by reference in its entirety.

Technical Field

The disclosure relates to the fields of computational chemistry, bioinformatics, genetic engineering and protein engineering, relates to improvement of robustness of hydrolases by combining high-pressure molecular dynamics simulation and free energy calculation, and specifically, relates to a method for improving the robustness of hydrolases based on high-pressure molecular dynamics simulation combined with free energy calculation and screening.

BACKGROUND

Hydrolases (EC 3, Hydrolase) are the general term for a class of enzymes that catalyze hydrolysis reactions, including lipase, esterase, protease, etc., and can catalyze various reactions, such as ester exchange reaction, esterification, and transesterification. Due to good catalytic performance, hydrolases have been widely used in industrial fields such as food, medicine, oil production and processing, daily necessities and cosmetics. However, the actual industrial production conditions are extremely harsh and complicated, and hydrolases need to be frequently exposed to high temperature, high pressure, organic solvents, metal ions, extreme pH, etc. Therefore, in order to deal with the harsh environmental conditions, hydrolases need to have good robustness. The robustness of the hydrolases refers to the characteristic that the hydrolases can still maintain stable catalytic properties when disturbed by environmental changes and other uncertain factors, for example, the hydrolases have high thermostability and catalytic activity at the same time. However, due to a trade-off between the catalytic activity and stability of the enzyme (there is a negative correlation between the catalytic activity and stability of the enzyme), the robustness of the hydrolases is relatively poor.

Shih et al. mutated the aspartic acid 189 residue in the lid region of the NTU 03 lipase, resulting in an increase in the catalytic activity of the enzyme, but a decrease in thermostability (Shih T W, Pan T M. Substitution of Asp189 residue alters the activity and thermostability of *Geobacillus* sp. NTU 03 lipase [J]. Biotechnology Letters, 2011, 33 (9): 1841-1846.). However, there are also a few related reports about the improvement of enzyme stability and catalytic activity at the same time. For example, Wong et al. modified the D-amino acid oxidase derived from *Trigonopsis variabilis* by homology modeling and molecular docking, improving the thermostability and activity of the mutant Phe54Tyr at the same time (Kamal M Z, Ahmad S, Molugu T R, et al. In vitro evolved non-aggregating and thermostable lipase: structural and thermodynamic investigation [J]. J Mol Biol, 2011, 413 (3): 726-741.). It can be seen that although a few mutants with enhanced robustness can be obtained by traditional modification methods, since the specific mechanism of robustness improvement is not yet clear, the blindness of modification is relatively large. The robustness evolution of enzymes is still a thorny issue.

At present, the modification of the catalytic properties of enzymes is mainly divided into directed evolution, semi-rational design and rational design. Among them, directed evolution requires a large amount of work, time and labor (for example, Genetically engineered strain with good thermostability for producing acetyl-CoA oxidase and construction method and application thereof, CN106520713A). Although rational design greatly reduces the experimental work, the success rate is not optimistic (for example, Method for improving the thermostability of *Aspergillus oryzae* xylanase (AoXyn11A) by N-terminal substitution, CN104388412A). One of the difficulties in the modification of catalytic properties of enzymes is to select key regions closely related to the function of hydrolases. Semi-rational design redesigns the target protein based on existing knowledge, and can quickly and efficiently select the key regions. At the same time, semi-rational design not only makes up for the time-consuming and labor-consuming shortcomings of directed evolution, but also makes up for the low success rate of rational design.

High-temperature molecular dynamics simulation is widely used in screening enzyme mutation sites to improve enzyme activity and thermostability (Heat-stable lipase and preparation method and application thereof, CN105950585A; Heat-resistant mutant lipase with high catalytic activity and preparation method and application thereof, CN106047838A). However, the increase in temperature causes entropy increase of molecules, and the volume of a protein increases when unfolding. At a constant temperature, the increase in pressure will increase the degree of order of molecules or decrease the entropy of a system, and the volume of the protein in the unfolding state will decrease. Therefore, the stability of the protein induced by pressure can to a certain extent resist thermal denaturation caused by high temperature. In other words, a temperature increase of dozens of units will affect the protein structure, while a pressure increase of several thousand units will affect the protein structure. Therefore, the effect of pressure on protein can be studied from a wider range. In addition, high temperature will cause thermal expansion of protein, which is not conducive to the study of the overall structure of the protein from a microscopic perspective. However, different parts of an enzyme respond to pressure differently, and under high pressure, the changes in protein conformation can be analyzed from a more microscopic perspective. High-temperature molecular dynamics simulation is to study the fluctuations of local amino acids when the temperature is raised, can only solve the problem about thermostability and has little effect on the catalytic activity. Certainly, whether it is by changing the temperature or changing the pressure to affect the structure and catalytic activity of an enzyme, it is necessary to combine the corresponding computing method to predict the stability of a protein.

Multi-scale free energy calculation refers to calculation from multiple perspectives of protein dynamics, protein thermodynamics, and prediction algorithms to predict protein stability. There are a variety of calculation methods used to predict the effect of mutations on protein stability: a direct computing method using energy functions (also known as force fields), a machine learning method in pattern recognition, and a combination of the two. According to different physical methods used in the construction of biomolecular models, the energy function direct computing method can be divided into three types: physical effective energy function, statistical effective energy function or knowledge-based force field and empirical effective energy function (Johnston M A, Chresten R Søndergaard, Nielsen J E. Integrated prediction of the effect of mutations on multiple protein characteristics [J]. Proteins-structure Function & Bioinformatics, 2015, 79 (1): 165-178.). STRUM utilizes physical effective energy functions and knowledge-based force fields combined with machine learning (Quan L, Lv Q, Zhang Y. STRUM: structure-based prediction of protein stability changes upon single-point mutation [J]. Bioinformatics (19): 2936.). I-mutant 2.0 utilizes statistical effective energy functions combined with machine learning (Emidio C, Piero F, Rita C. I-Mutant 2.0: predicting stability changes upon mutation from the protein sequence or structure [J]. Nucleic Acids Research, 2005, 33:W306-310.). FoldX utilizes empirical effective energy functions (Schymkowitz J, Borg J, Stricher, F, et al. The FoldX web server: an online force field. Nucleic Acids Research 2005, 33:W382-388.). PoPMuSiC utilizes statistical effective energy functions combined with machine learning, and also considers volume changes caused by mutations (Dehouck Y, Kwasigroch J M, Gilis D, et al. PoPMuSiC 2.1: a web server for the estimation of protein stability changes upon mutation and sequence optimality [J]. BMC Bioinformatics, 2011, 12:151-162.). The above software is complementary in the force field computing method and covers all prediction algorithms. In addition, FoldX predicts protein stability based on high-resolution 3D structures, I-mutant 2.0 predicts protein stability through sequences and structures, and STRUM predicts protein stability using sequences and low-resolution structures. Although the above software can analyze the effect of mutations on protein molecules based on structures, they rely on static structures to evaluate the effect of mutations on protein structures and functions. Different from the software that predicts the effect of mutations on protein stability by computing enthalpy, the prediction software DynaMut can sample conformation based on protein dynamics to analyze and visualize the effect of mutations on protein structures and functions, and evaluate changes of vibrational entropy (the previous prediction software is based on machine learning and enthalpy considerations) to predict the effect of mutations on protein dynamics and stability.

SUMMARY

When hydrolases with improved robustness are screened using existing high-temperature molecular dynamics simulation, a temperature increase of dozens of units (C) will affect the structure of a protein, and it is difficult to fine-tune the temperature to change the structure of an enzyme. In addition, high-temperature molecular dynamics simulation is used to study the fluctuations of local amino acids when the temperature is raised. That is, high-temperature molecular dynamics simulation is suitable for studying the thermostability of enzymes, and is not very helpful for studying changes in catalytic activity of enzymes when the temperature is raised.

The existing methods for computing and predicting protein structure changes all predict the effect of mutations on protein stability from a single perspective, and have limitations. For example, FoldX predicts protein stability based on a high-resolution 3D structure, but cannot predict proteins without a high-resolution 3D structure. Although I-mutant 2.0, STRUM and PoPMuSiC can predict the effect of mutations on protein stability based on sequences, the prediction algorithm used only involves one or two of the physical effective energy function, the statistical effective energy function, or the knowledge-based force field and empirical effective energy function. DynaMut predicts the effect of mutations on protein structures by evaluating changes in vibrational entropy and sampling conformation based on protein dynamics, but does not compute the effect of enthalpy on protein stability.

The disclosure provides a method for screening hydrolases with improved robustness. The method is based on a combination of high-pressure molecular dynamics model simulation and free energy calculation, and includes the following steps: first, screening out key regions closely related to a function of hydrolases by combining high-pressure disturbance and molecular dynamics model simulation, then performing virtual saturation mutagenesis on amino acids in the key regions, predicting the stability of mutants with multi-scale free energy calculation software, and screening out mutants with high robustness.

The method of the disclosure includes the following steps: step (1) virtual screening of high robustness related regions and sites, (2) virtual mutagenesis of the high robustness related regions and sites, (3) stability prediction of virtual mutants, and (4) preparation of mutants and characterization of enzymatic properties.

(1) Virtual Screening of High Robustness Related Regions and Sites

Using a crystal structure of a hydrolase as an initial model, molecular dynamics (MD) simulation or Monte Carlo (MC) simulation is performed under different pressure ranges (0-20,000 Bar). By computing and analyzing change trends of B-Factor, root mean square deviation (RMSD), radius of gyration (Rg) and root mean square fluctuation (RMSF), key regions closely related to the function of the hydrolase are determined. The regions where amino acid residues with highest B-factor, root mean square deviation, and root mean square fluctuation values are located are selected as the key regions. Tools that can be used for the molecular dynamics simulation include Gromacs, AMBER, and NAMD.

The range of 0-20,000 Bar includes vacuum to ultra-high pressure. Preferably, the pressure gradient is set from 1 Bar (a standard atmospheric pressure), and the maximum pressure generally does not exceed 8,000 Bar (most proteins are denatured and inactivated at 8,000 Bar).

When molecular dynamics simulation is performed using Gromacs, (1) using an AMBER99 force field, an enzyme protein is put into a cube box filled with water. The shortest distance between the protein and the edge of the box is 1.0 nm. A water model uses TIP4P, because the TIP4P model is one of the most reliable water models for studying pressure effects. Then charges are neutralized to make the entire system reach an equilibrium state. (2) The energy of the system is minimized using the steepest descent method to ensure that the structure is normal, the interatomic distance is appropriate, and the geometric configuration is reasonable. (3) Then, 400 ps constant-temperature and constant-volume ensemble (NVT) balancing is performed under periodic boundary conditions. The system temperature is raised to 313 K using Berendsen temperature coupling, and the system is gradually increased from atmospheric pressure to the expected gradient high pressure using Parrinell-Rahman pressure coupling. (4) After the system is balanced, restrictions are eliminated and finished product simulation is performed. The entire simulation process uses the Leap-frog algorithm to perform integration, and long-distance electrostatic potential energy is computed using the PME method. All simulations are performed three times at different initial speeds, with a duration of 30 ns.

The B-factor is computed by B-Fitter. The calculation of RMSD, Rg and RMSF is performed by Gromacs' own program. The B-factor reflects the conformational state of protein molecules in a crystal. The higher the B-factor, the more unstable the conformation of the corresponding part. RMSD is usually used to characterize the convergence of a protein structure to an equilibrium state. RMSF is mainly used to analyze the softness and flexibility of each amino acid in a protein. Rg is used to characterize the compactness of the protein structure. As the pressure increases, the overall structure of the protein presents a compression trend, and the Rg value presents a decreasing trend. The regions where the amino acid residues with the highest B-factor, RMSD and RMSF values are located are selected as the key regions.

The secondary structure of the protein is computed by DSSP, and the address for obtaining DSSP is swift.cmbi.umcn.nl/gv/dssp/. PYMOL 2.0 is employed for structure analysis of the hydrolase.

If a certain hydrolase does not have a crystal structure, the primary sequence of the hydrolase can be downloaded from the NCBI database. Homologous sequence identification is performed using the basic local alignment search tool BLASTp. Then a template is selected, homology modeling is performed using homology modeling software, and the model is adjusted and optimized. The homology modeling software includes Swiss-model, Modeller and easymodeller. The model constructed by the modeling software can be optimized by the Chrion (dokhlab.med.psu.edu/chiron/) server, missing heavy atoms are added by PDB2PQR (nbcr-222.ucsd.edu/pdb2pqr_2.1.1/), and the model can be evaluated by the SAVES (servicesn.mbi.ucla.edu/SAVES/) server. Finally, the optimized model is used for molecular dynamics simulation.

(2) Virtual Mutagenesis of Mutants with High Robustness

Virtual saturation mutagenesis is performed on the amino acids in the key regions determined in step (1) to construct a virtual mutant library. In order to avoid loss of salt bridges caused by mutagenesis, all acidic amino acids and basic amino acids in the key regions are not mutated.

The virtual saturation mutagenesis refers to that a certain amino acid is mutated into another 19 amino acids using software.

(3) Stability Prediction of Virtual Mutants

The stability of the above virtual mutants is predicted using FoldX, I-mutant 2.0, STRUM, DynaMut and PopMusic, respectively. False positive mutants are excluded as much as possible, and the intersection of positive mutants in the prediction results of the above software is selected. In such a way, the mutants in the intersection have a higher probability of high robustness.

When the stability of the virtual mutants is predicted, protein stability is predicted using multi-scale free energy calculation. Multi-scale free energy calculation refers to calculation from multiple perspectives of protein dynamics, protein thermodynamics, and prediction algorithms. According to the multi-scale free energy calculation results, the mutants with the free energy difference (ΔGmutant-ΔGwild) less than 0 are screened as positive mutants.

When FoldX is used for performing stability prediction (foldxsuite.crg), the free energy of protein unfolding is computed using a Stability module of FoldX.

When I-mutant 2.0 is used for performing stability prediction (folding.biofold.org/cgi-bin/i-mutant2.0.cgi), "protein sequence" is selected, the stability change of the protein is predicted from the protein sequence, and the instructions and requirements are followed.

When STRUM is used for performing stability prediction (zhanglab.ccmb.med.umich.edu/STRUM/), the I mode is selected to predict single-point mutations, the protein sequence is uploaded, and the mutation list is entered.

When DynaMut is used for performing stability prediction (biosig.unimelb.edu.au/dynamut/prediction), the wild-type structure and mutant list files are uploaded.

When PoPMuSiC is used for performing stability prediction (soft.dezyme.com/query/create/pop), the PDB number and mutational site information are uploaded.

(4) Preparation of Mutants and Characterization of Enzymatic Properties

Mutations are introduced using a site-directed mutagenesis technology into the mutants in the intersection of the positive mutants selected in step (3), and the mutants are expressed using the genetically engineered bacteria. The enzyme activity of a separated and purified enzyme is measured and analyzed by a circular dichroism spectrum. Finally, mutants with significantly improved robustness are screened out. The specific steps are as follows:

(4-1) The mutation sites screened in step (3) are introduced into a target protein: Reverse PCR is performed using a recombinant plasmid with a hydrolase gene as a template and an oligonucleotide sequence with mutation sites as a primer. The full length of a mutant plasmid is amplified, digestion is performed using Dpn I restriction endonuclease, and the digested product is transformed into $E.\ coli$ JM109. The $E.\ coli$ JM109 with the digested plasmid successfully transformed is screened and subjected to amplification culture. The recombinant plasmid is extracted from the culture, and transformed into $E.\ coli$ or yeast to induce expression to obtain a protein with single-point mutation.

(4-2) A nickel ion affinity chromatography column with Ni-NTA as a filler or ion exchange chromatography is used to purify the protein with single-point mutation i.e., the purified enzyme, from the culture of $E.\ coli$ or yeast with the aid of an AKTA purifier.

(4-3) The purified enzyme is dialyzed. The dialyzed enzyme solution is diluted to a concentration of 0.01-0.1 $mg \cdot mL^{-1}$. The unfolding temperature ($T_m$) of the sample is measured using a circular dichrograph, and a temperature gradient is set to 20-100° C.

The disclosure provides the method for screening hydrolases with improved robustness based on the combination of high-pressure molecular dynamics model simulation and free energy calculation. In the disclosure, high-pressure disturbance and molecular dynamics model simulation are combined to screen out key regions closely related to the function of hydrolases, and then virtual saturation mutagenesis is performed on amino acids in the key regions. The effect of mutations on protein stability is predicted from multiple perspectives of protein dynamics, protein thermodynamics, and prediction algorithms by combining multi-scale free energy calculation software, and mutants with high robustness are screened out. Experimental results show that the mutants screened by the method have a high frequency of positive mutations, and the screening workload can be effectively reduced.

As an important class of industrial enzymes, hydrolases have certain pressure activation phenomena. Compared with the method of directly changing the pressure to affect the structure and properties of hydrolases, the method of reasonably designing the hydrolase firstly using molecular dynamics model simulation under different pressures and free energy calculation and then performing verification through experiments has the advantages that the transformation efficiency of the hydrolases is significantly improved and a lot of costs are saved.

High-temperature molecular dynamics simulation is widely used to screen the key regions and mutation sites of enzymes. However, the increase in temperature leads to an increase in the entropy of a molecule, the volume of a protein will increase when unfolding, and even thermal denaturation occurs. The application of high-pressure molecular dynamics simulation can analyze the changes in protein conformation and select key regions from an overall perspective and a more microscopic perspective, and improve the robustness of hydrolases more specifically.

The disclosure compares the values of RMSD and RMSF under different pressures, and selects regions with high RMSD and RMSF values to determine the key regions.

In order to predict the effect of mutations on protein stability in an all-round and multi-scale manner, the disclosure superimposes and uses multiple free energy computing software to predict the effect of pressure changes on enzyme robustness.

DETAILED DESCRIPTION

Example 1: T1 Lipase

1. Screening of High Robustness Related Regions and Sites

The present example used the crystal structure (PDB id: 2dsn) of wild-type T1 lipase (T1 lipase from *Geobacillus zalihae* strain T1, SEQ ID NO:1) as an initial model, used SWISS-MODEL to perform homology modeling of mutants, and used Gromacs (version 2019.03) to perform molecular dynamics simulation.

The shortest distance to the edge of a box was 1.0 nm. TIP4P was used as a water model, because the model was one of the most reliable water models for studying the pressure effect. Then 5 Na$^+$ were added to neutralize charges to make the entire system reach an equilibrium state. The energy of the system was minimized using a 50,000 step steepest descent method to ensure that the structure was normal, the interatomic distance was appropriate, and the geometric configuration was reasonable. Then, 400 ps constant-temperature and constant-volume ensemble (NVT) balancing was performed under periodic boundary conditions. The system temperature was raised to 313 K using Berendsen temperature coupling, and the system was gradually increased from atmospheric pressure to the expected high pressures (100, 500, 1,000, 2,000, and 4,000 Bar) using Parrinell-Rahman pressure coupling. After the system was balanced, restrictions were eliminated and finished product simulation was performed. The entire simulation process used the Leap-frog algorithm to perform integration, and long-distance electrostatic potential energy was computed using a PME method. A limit constraint algorithm chose Lincs, and the precision was set to 1, 4. The cutoff method of proximity search was Verlet, and the search method was grid search.

To ensure the repeatability and fairness of the results, all simulations were performed three times at different initial speeds with a duration of 30 ns.

RMSD, RMSF and Rg statistics of the protein and mutants thereof in the present example were all executed by Gromacs' own program. The secondary structure of the protein was computed by DSSP. The address for obtaining DSSP is swift.cmbi.umcn.nl/gv/dssp/. PYMOL 2.0 was used for structure analysis of lipase.

Figure 1:
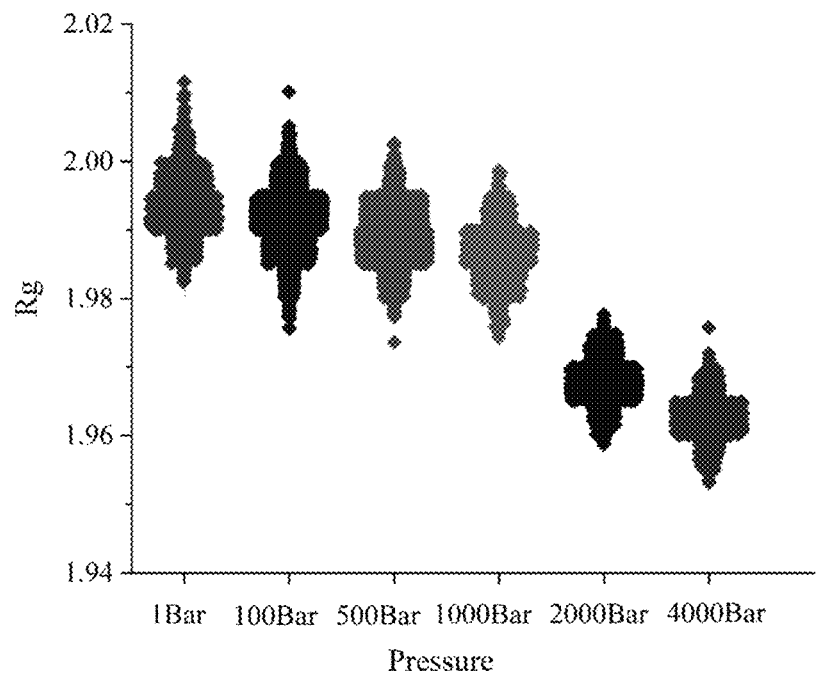
FIG. 1 shows Rg analysis of a T1 lipase backbone.
Figure 2:
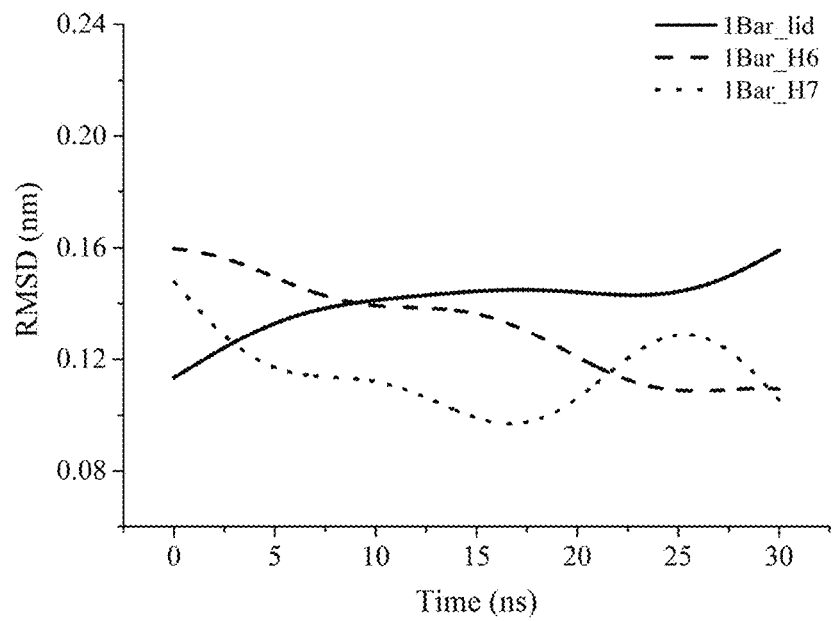
FIG. 2 shows RMSD analysis of a T1 lipase lid structure at 1 Bar.
Figure 3:
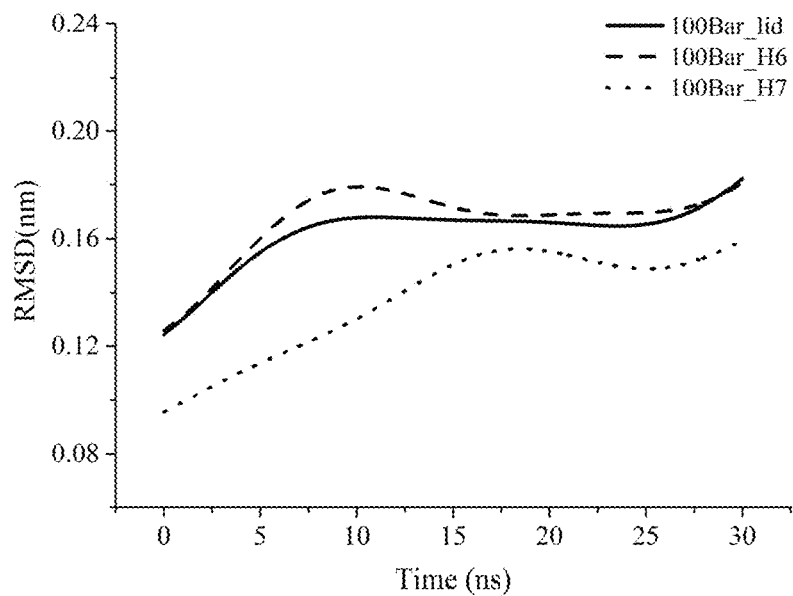
FIG. 3 shows RMSD analysis of a T1 lipase lid structure at 100 Bar.
Figure 4:
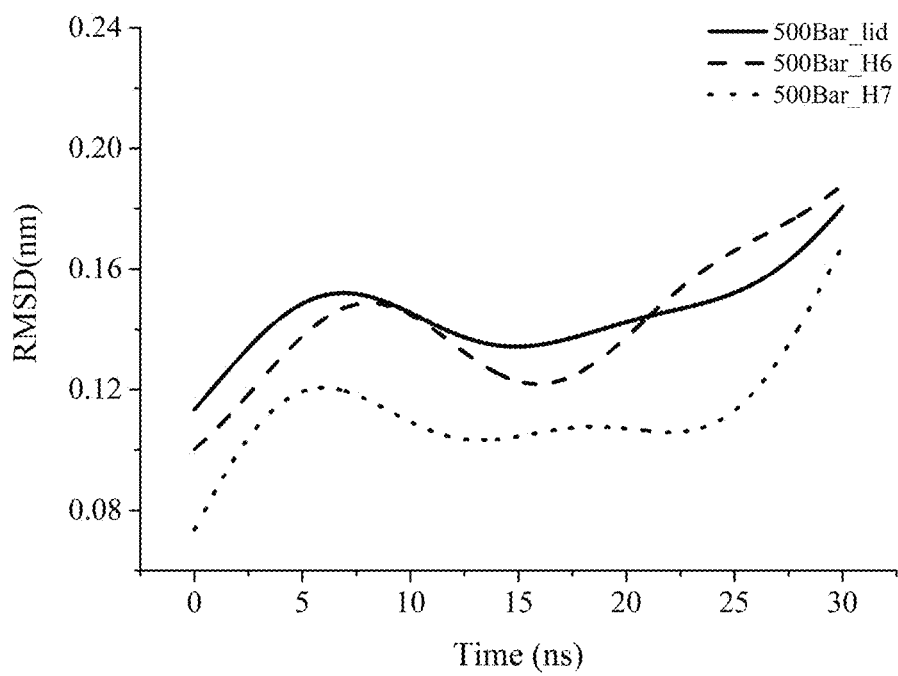
FIG. 4 shows RMSD analysis of a T1 lipase lid structure at 500 Bar.
Figure 5:
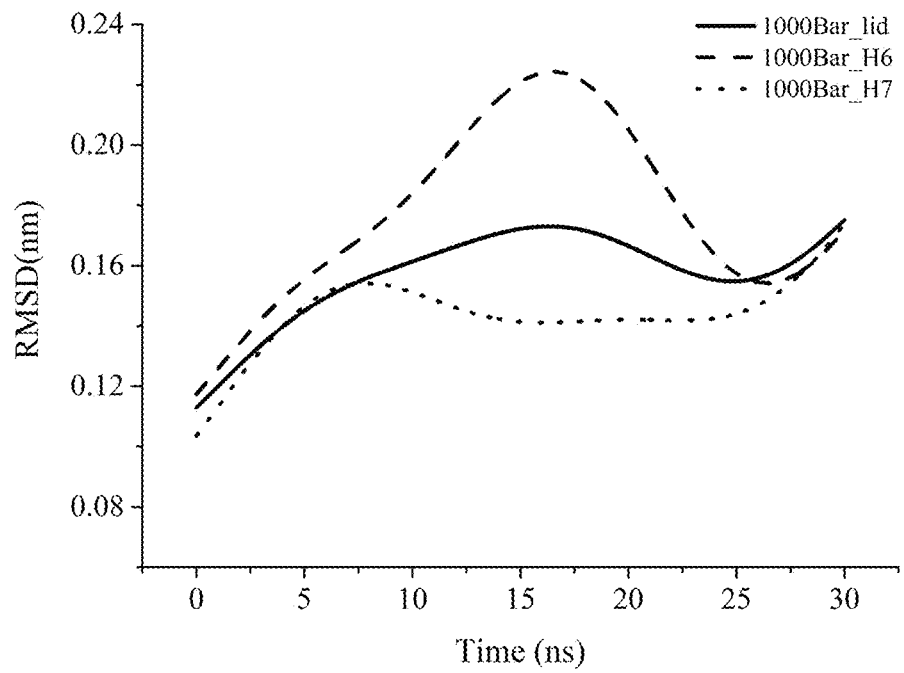
FIG. 5 shows RMSD analysis of a T1 lipase lid structure at 1,000 Bar.
Figure 6:
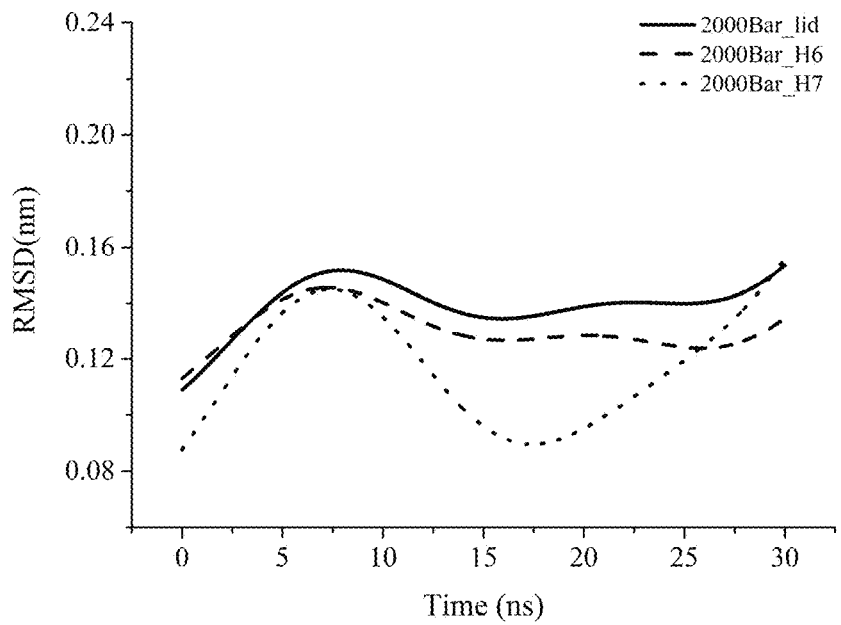
FIG. 6 shows RMSD analysis of a T1 lipase lid structure at 2,000 Bar.
Figure 7:
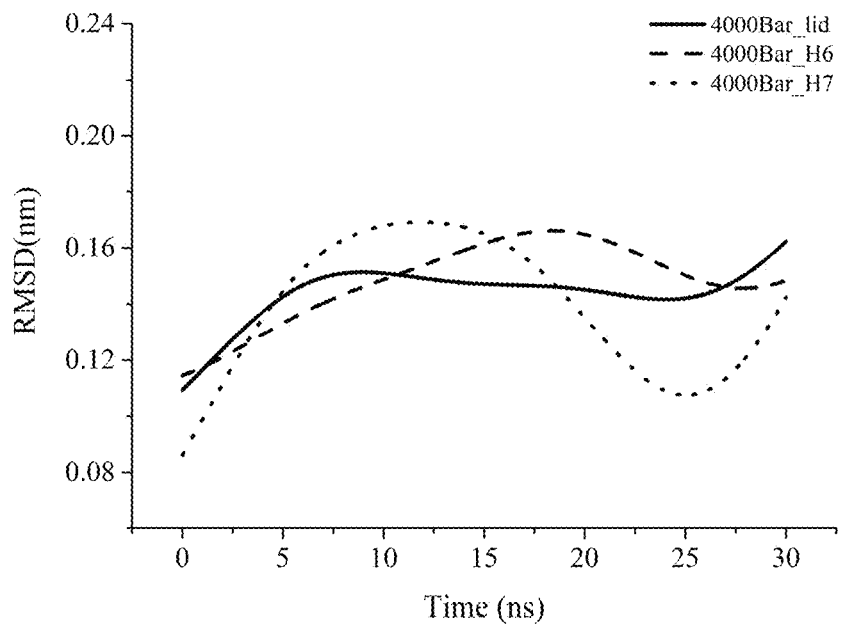
FIG. 7 shows RMSD analysis of a T1 lipase lid structure at 4,000 Bar.

FIG. 1 reflects the changes in the radius of gyration (Rg) of the T1 lipase backbone. The results show that as the pressure increases, the Rg of the T1 lipase shows a downtrend, that is, the protein structure was continuously compressed under high pressure. Especially under the condition of 2,000 Bar, the protein Rg decreased most obviously. When the pressure continued to increase to 4,000 Bar, the protein structure did not change significantly. It is speculated that the pressure of 2,000 Bar caused the T1 lipase to produce the greatest degree of compression, and the protein was already in a relatively dense state.

From FIG. 2 to FIG. 7, the flexibility of the α6 helix is higher than that of the α7 helix under different pressures. At 1,000 Bar, the RMSD of the α6 helix reaches the maximum value and is higher than the entire lid region.

Figure 8:
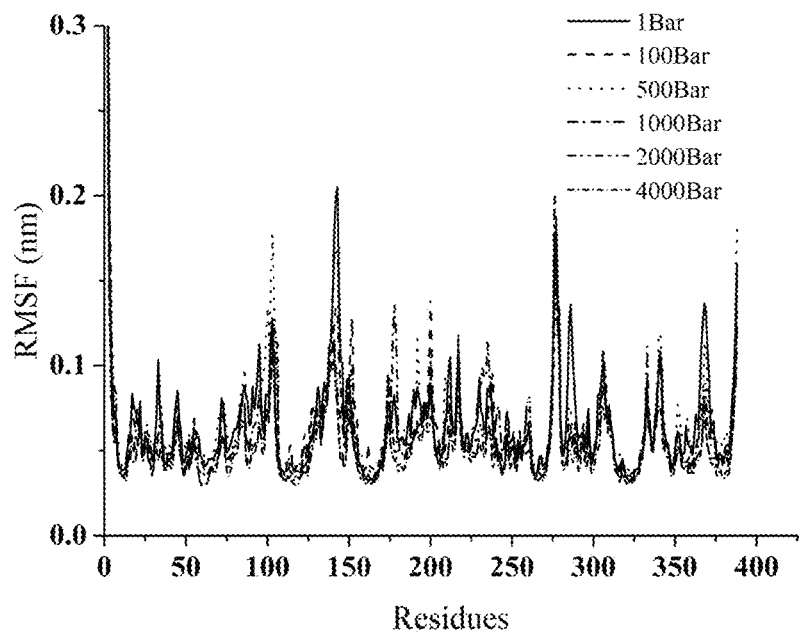
FIG. 8 shows RMSF analysis of a T1 lipase lid structure under different pressures.
Figure 9:
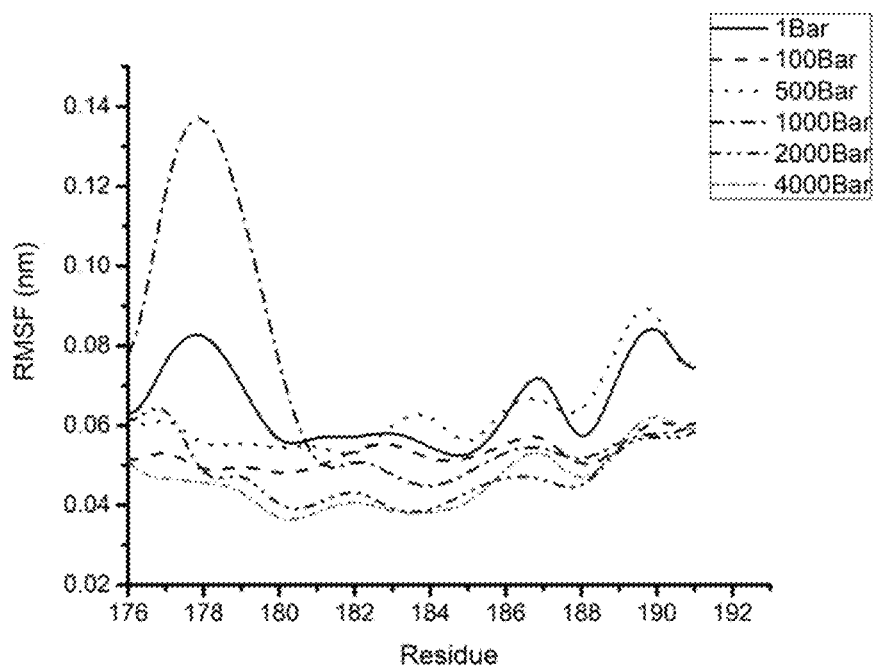
FIG. 9 shows RMSF analysis of an α6 helix of a T1 lipase lid structure under different pressures.
Figure 10:
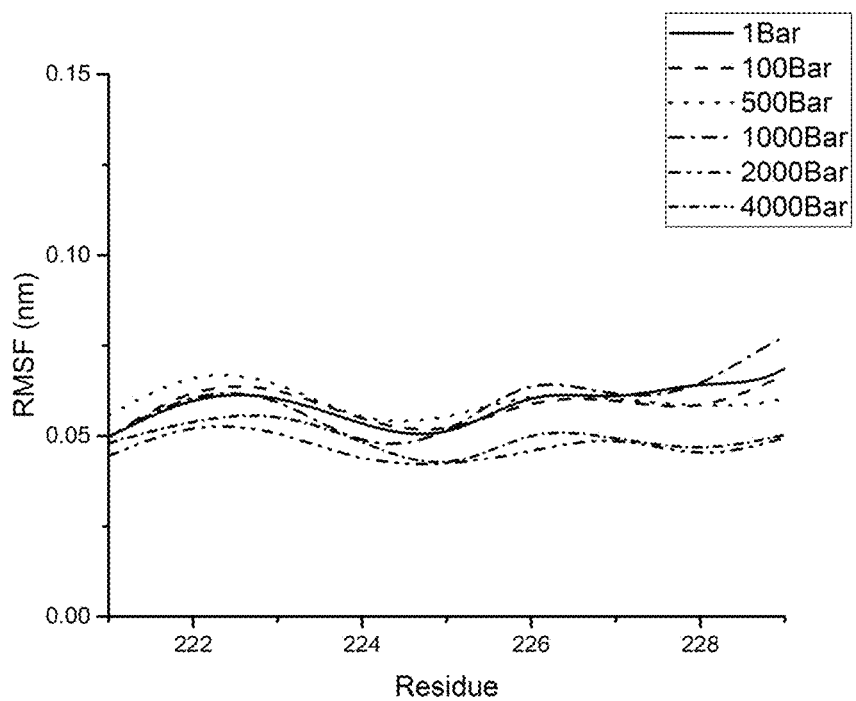
FIG. 10 shows RMSF analysis of an α7 helix of a T1 lipase lid structure under different pressures.
Figure 11:
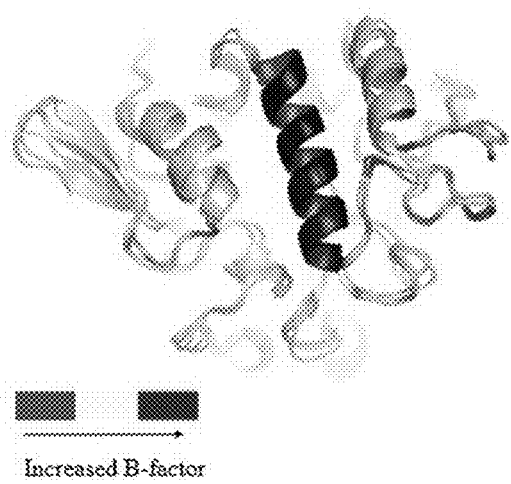
FIG. 11 shows an α6 helix factor B label of a T1 lipase lid structure.

To analyze the fluctuation of each amino acid, the RMSF of amino acid residues on two helices of the overall structure and lid structure region of the T1 lipase under different pressures was computed. FIG. 8 shows changes in the overall RMSF of the protein. FIG. 9 and FIG. 10 show the calculation of the RMSF of the α6 and α7 helices, respectively. The results show that under different pressures, the RMSF of the α6 helix is significantly higher than that of the α7 helix, and the RMSF reaches the maximum value at 1,000 Bar, which is basically the same as the change trend of the RMSD value. The RMSF of the α6 helix is the smallest under a pressure of 4,000 Bar, and it is speculated that the protein may be inactivated at the time. The protein conformations based on B-factor staining (α6 helix) were superimposed together by least squares. As shown in FIG. 11, the results show that the flexibility of a local region of the α6 helix increases from glutamine No. 184, and the flexibility of the C-terminal of the whole α6 helix is significantly higher than that of the N-terminal. In addition, the N-terminal of the α6 helix unwound in an open state. Based on this, it is further speculated that the C-terminal of the α6 helix is a functional region closely related to the function of lipase.

2. Virtual Mutagenesis of Mutants with High Robustness

The α6 helix of the lid structure of T1 lipase was identified as the key region, and 15 amino acids on the helix were subjected to virtual saturation mutagenesis treatment to construct a mutant library. To avoid salt bridge loss caused by mutations, all acidic and basic amino acids (Asp178, Arg179, Asp182, Lys185 and Glu189) on the helix α6 were excluded, and the remaining 10 amino acid sites were subjected to virtual saturation mutations to construct a primary mutant library.

3. Prediction of Stability of Virtual Mutants Using Multi-Scale Free Energy Calculation The free energy change of the mutants was computed using FoldX and the mutants with ΔΔG ($\Delta G_{mutant}$-$\Delta G_{wild}$) less than 0 were screened. 5 sites Q184, A186, V187, L188 and A190 at the C-terminal of the α6 helix were used as target mutation sites, and a total of 33 mutants were obtained. To eliminate false positive mutants in the mutant library maximally and maximize the success rate of mutant screening, FoldX and DynaMut were used to screen mutants with ΔΔG ($\Delta G_{mutant}$-$\Delta G_{wild}$) less than 0, respectively, and the intersection of the screening results of the two pieces of software had 28 mutants. Three pieces of software, i.e. FoldX, DynaMut and I-mutant 2.0, were used to screen mutants with ΔΔG ($\Delta G_{mutant}$-$\Delta G_{wild}$) less than 0, respectively, and the intersection of the screening results of the three pieces of software had 12 mutants. Four pieces of software, i.e. FoldX, DynaMut, I-mutant 2.0 and STRUM, were used to screen mutants with ΔΔG ($\Delta G_{mutant}$-$\Delta G_{wild}$) less than 0, respectively, the intersection of the screening results of the four pieces of software had 8 mutants. Five pieces of software, i.e. FoldX, DynaMut, I-mutant 2.0, STRUM and POPMusic, were used to screen mutants with ΔΔG ($\Delta G_{mutant}$-$\Delta G_{wild}$) less than 0, respectively, the intersection of the screening results of the five pieces of software had 8 mutants. The screening results show that the number of mutants screened by combinations of a few pieces of software is large and the workload is large, while prediction with five pieces of software combined cannot improve the screening efficiency, so four pieces of software are preferred to be combined for prediction. In addition, to verify the effect of the number of software combinations on the accuracy of the screening results, we also tested the thermostability of the enzymes for the above 28 mutants to verify the positive mutation rate.

4. Preparation of Mutants and Characterization of Enzymatic Properties

The T1 lipase gene from *Geobacillus zalihae* strain T1 was subjected to protein expression using an *E. coli* expression system. The amino acid sequence of the T1 lipase gene is shown in the sequence table (Genbank: AY260764). The selected plasmid is pET-28a, and the *E. coli* host is *E. coli* JM109.

(1) Firstly, the Recombinant Plasmid pET-28a-T1 was Constructed as a Template for the Subsequent Construction of T1 Lipase Mutants.

BamH I and EcoR I restriction sites were added to the 5' end and the 3' end of the T1 lipase gene, respectively. Double digestion was performed on the synthesized T1 lipase full-length gene and the pET-28a vector with BamH I and EcoR I, respectively. The reaction system was 50 μL, containing T1 lipase gene (or pET-28a plasmid), 20 μL; 10×Q Buffer, 5 μL; BamH I and EcoR I, 2 μL each; and dd $H_2O$, 21 μL. The enzyme digestion conditions were: 37° C., 2 h. After the digestion, the digested product was verified by nucleic acid gel electrophoresis. The gel was cut according to the size of the target band, and the double digestion products of the T1 lipase gene and the pET-28a plasmid were gel-recovered with a DNA gel recovery kit. The T1 lipase gene and the vector pET-28a were ligated using T4 DNA ligase. The reaction system was 10 μL, containing target fragment, 6 μL; pET-28a plasmid, 2 μL; 10×T4 DNA Ligase Buffer, 1 μL; and T4 DNA Ligase, 1 μL. The reaction system was put in a metal bath at 16° C. for ligation overnight for 10-12 h.

(2) Amplification of Recombinant Plasmid pET-28a-T1

After the ligation, the ligation product of the target gene and the vector was purified using a PCR product purification kit, and then transformed into the *E. coli* JM109. The transformed solution was spread on an LB plate containing kanamycin sulfate (50 μg/mL), and cultured to obtain single colonies. Single colony transformants were selected and a kanamycin-containing LB medium was inoculated with the single colony transformants for performing shaking culture for 6-8 h. The bacterial solution was taken and subjected to PCR verification and sequencing verification. The recombinants verified correct were used in subsequent experiments.

(3) Construction of Single-Point Mutant Recombinant Plasmid

Primers shown in Table 1 were designed. The recombinant plasmid pET-28a-T1 was used as an original template for performing whole-plasmid PCR amplification, and a mutant recombinant plasmid was constructed. The PCR reaction system was 50 μL, containing dd$H_2O$, 18 μL; 2×Max Buffer, 25 μL; dNTP Mix (10 mM), 1 μL; pET-28a-T1 template, 1 μL; forward and reverse primers (10 mM), 2 μl each; and Phanta Max Super-Fidelity DNA Polymerase, 1 μL. The PCR reaction conditions were: 95° C., 30 s; 95° C., 15 s, 68° C., 15 s, 72° C., 5 min, 30 cycles; 72° C., 5 min; and preservation at 4° C. After the reaction, the PCR product was digested with the Dpn I enzyme. The digested product was transformed into *E. coli* JM109. Finally, the recombinant sequenced correct was subjected to amplification culture, and the plasmid was extracted and transformed into *E. coli* BL21 (DE3) to be preserved at −20° C.

TABLE 1

Primer design of mutants

| Mutant | Primer | |
|---|---|---|
| Q184I | Forward: | 5'-TTGATCTGATCAAAGCAGTGTTAGAAGCAGCCGCC-3 (SEQ ID NO: 4) |
| | Reverse: | 5'-CACTGCTTTCATCAGATCAAAAAAGCGATCGG-3 (SEQ ID NO: 5) |
| Q184L | Forward: | 5'-TTGATCTGTTGAAAGCAGTGTTAGAAGCAGCCGCC-3 (SEQ ID NO: 6) |
| | Reverse: | 5'-CACTGCTTTCAACAGATCAAAAAAGCGATCGG-3 (SEQ ID NO: 7) |
| Q184M | Forward: | 5'-TTGATCTGATGAAAGCAGTGTTAGAAGCAGCCGCC-3 (SEQ ID NO: 8) |
| | Reverse: | 5'-TGCTTTCATCAGATCAAAAAAGCGATCGG-3 (SEQ ID NO: 9) |
| Q184Y | Forward: | 5'-TTGATCTGTACAAAGCAGTGTTAGAAGCAGCCGCC-3 (SEQ ID NO: 10) |
| | Reverse: | 5'-TGCTTTGTACAGATCAAAAAAGCGATCGG-3 (SEQ ID NO: 11) |

TABLE 1-continued

Primer design of mutants

| Mutant | Primer |
|---|---|
| Q184V | Forward: 5'-TTGATCTGGTTAAAGCAGTGTTAGAAGCAGCCGCC-3 (SEQ ID NO: 12)<br>Reverse: 5'-TGCTTTAACCAGATCAAAAAAGCGATCGG-3 (SEQ ID NO: 13) |
| Q184F | Forward: 5'-TTGATCTGTTTAAAGCAGTGTTAGAAGCAGCCGCC-3 (SEQ ID NO: 14)<br>Reverse: 5'-TGCTTTAAACAGATCAAAAAAGCGATCGG-3 (SEQ ID NO: 15) |
| A186L | Forward: 5'-TTGATCTGCAGAAATTAGTGTTAGAAGCAGCCGCCGTG-3' (SEQ ID NO: 16)<br>Reverse: 5'-GCTGCTTCTAACACTAATTTCTGCAGATCAAAAAAGCG-3' (SEQ ID NO: 17) |
| A186K | Forward: 5'-TTGATCTGCAGAAAAAGGTGTTAGAAGCAGCCGCCGTG-3' (SEQ ID NO: 18)<br>Reverse: 5'-GCTGCTTCTAACACCTTTTTCTGCAGATCAAAAAAGCG-3' (SEQ ID NO: 19) |
| A186R | Forward: 5'-TTGATCTGCAGAAACGTGTGTTAGAAGCAGCCGCCGTG-3' (SEQ ID NO: 20)<br>Reverse: 5'-GCTGCTTCTAACACACGTTTCTGCAGATCAAAAAAGCG-3' (SEQ ID NO: 21) |
| A186Q | Forward: 5'-TTGATCTGCAGAAACAGGTGTTAGAAGCAGCCGCCGTG-3' (SEQ ID NO: 22)<br>Reverse: 5'-GCTGCTTCTAACACCTGTTTCTGCAGATCAAAAAAGCG-3' (SEQ ID NO: 23) |
| A186Y | Forward: 5'-TTGATCTGCAGAAATACGTGTTAGAAGCAGCCGCCGTG-3' (SEQ ID NO: 24)<br>Reverse: 5'-GCTGCTTCTAACACGTATTTCTGCAGATCAAAAAAGCG-3' (SEQ ID NO: 25) |
| A186M | Forward: 5'-TTGATCTGCAGAAAATGGTGTTAGAAGCAGCCGCCGTG-3' (SEQ ID NO: 26)<br>Reverse: 5'-GCTGCTTCTAACACCATTTTCTGCAGATCAAAAAAGCG-3' (SEQ ID NO: 27) |
| A186F | Forward: 5'-TTGATCTGCAGAAATTTGTGTTAGAAGCAGCCGCCGTG-3' (SEQ ID NO: 28)<br>Reverse: 5'-GCTGCTTCTAACACAAATTTCTGCAGATCAAAAAAGCG-3' (SEQ ID NO: 29) |
| A186W | Forward: 5'-TTGATCTGCAGAAATGGGTGTTAGAAGCAGCCGCCGTG-3' (SEQ ID NO: 30)<br>Reverse: 5'-GCTGCTTCTAACACCCATTTCTGCAGATCAAAAAAGCG-3' (SEQ ID NO: 31) |
| V187F | Forward: 5'-TTGATCTGCAGAAATTATTTTTAGAAGCAGCCGCCGTG-3' (SEQ ID NO: 32)<br>Reverse: 5'-GCTGCTTCTAAAAATAATTTCTGCAGATCAAAAAAGCG-3' (SEQ ID NO: 33) |
| V187L | Forward: 5'-TTGATCTGCAGAAATTATTATTAGAAGCAGCCGCCGTG-3' (SEQ ID NO: 34)<br>Reverse: 5'-GCTGCTTCTAATAATAATTTCTGCAGATCAAAAAAGCG-3' (SEQ ID NO: 35) |
| V187Y | Forward: 5'-TTGATCTGCAGAAATTATACTTAGAAGCAGCCGCCGTG-3' (SEQ ID NO: 36)<br>Reverse: 5'-GCTGCTTCTAAGTATAATTTCTGCAGATCAAAAAAGCG-3' (SEQ ID NO: 37) |
| V187M | Forward: 5'-TTGATCTGCAGAAAGCAATGTTAGAAGCAGCCGCCGTG-3 (SEQ ID NO: 38)<br>Reverse: 5'-GCTGCTTCTAACATTAATTTCTGCAGATCAAAAAAGCG-3 (SEQ ID NO: 39) |
| L188M | Forward: 5'-CTGCAGAAAGCAGTGATGGAAGCAGCCGCCGTGGCA-3' (SEQ ID NO: 40)<br>Reverse: 5'-TGCCACGGCGGCTGCTTCCATCACTGCTTTCTGCAG-3 (SEQ ID NO: 41) |
| A190L | Forward: 5'-AAAGCAGTGTTAGAACTGGCCGCCGTGGCAAGCAACGTG-3 (SEQ ID NO: 42)<br>Reverse: 5'-GCTTGCCACGGCGGCCAGTTCTAACACTGCTTTCTGCAG-3 (SEQ ID NO: 43) |

TABLE 1-continued

Primer design of mutants

| Mutant | Primer | |
|---|---|---|
| A190Y | Forward: | 5'-CAGAAAGCAGTGTTAGAATACGCCGCCGTGGCAAGC-3 (SEQ ID NO: 44) |
| | Reverse: | 5'-GCTTGCCACGGCGGCGTATTCTAACACTGCTTTCTG-3 (SEQ ID NO: 45) |
| A190K | Forward: | 5'-CAGAAAGCAGTGTTAGAAAAGGCCGCCGTGGCAAGC-3 (SEQ ID NO: 46) |
| | Reverse: | 5'-GCTTGCCACGGCGGCCTTTTCTAACACTGCTTTCTG-3 (SEQ ID NO: 47) |
| A190R | Forward: | 5'-CAGAAAGCAGTGTTAGAACGTGCCGCCGTGGCAAGC-3 (SEQ ID NO: 48) |
| | Reverse: | 5'-GCTTGCCACGGCGGCACGTTCTAACACTGCTTTCTG-3 (SEQ ID NO: 49) |
| A190N | Forward: | 5'-CAGAAAGCAGTGTTAGAAAATGCCGCCGTGGCAAGC-3 (SEQ ID NO: 50) |
| | Reverse: | 5'-GCTTGCCACGGCGGCTAATTCTAACACTGCTTTCTG-3 (SEQ ID NO: 51) |
| A190M | Forward: | 5'-CAGAAAGCAGTGTTAGAAATGGCCGCCGTGGCAAGC-3 (SEQ ID NO: 52) |
| | Reverse: | 5'-GCTTGCCACGGCGGCCATTTCTAACACTGCTTTCTG-3 (SEQ ID NO: 53) |
| A190W | Forward: | 5'-CAGAAAGCAGTGTTAGAATGGGCCGCCGTGGCAAGC-3 (SEQ ID NO: 54) |
| | Reverse: | 5'-GCTTGCCACGGCGGCCCATTCTAACACTGCTTTCTG-3 (SEQ ID NO: 55) |
| A190H | Forward: | 5'-CAGAAAGCAGTGTTAGAACATGCCGCCGTGGCAAGC-3 (SEQ ID NO: 56) |
| | Reverse: | 5'-GCTTGCCACGGCGGCATGTTCTAACACTGCTTTCTG-3 (SEQ ID NO: 57) |
| A190F | Forward: | 5'-CAGAAAGCAGTGTTAGAATTTGCCGCCGTGGCAAGC-3 (SEQ ID NO: 58) |
| | Reverse: | 5'-GCTTGCCACGGCGGCAAATTCTAACACTGCTTTCTG-3 (SEQ ID NO: 59) |

(4) Preparation, Purification and Enzymatic Property Characterization of Single-Point Mutants E. coli BL21 (DE3) transformants carrying the mutant recombinant plasmid were selected for performing small-scale amplification culture, and PCR and sequencing verifications were performed on the bacterial solution. After the verifications were correct, the E. coli BL21 (DE3) respectively carrying 28 mutant recombinant plasmids was subjected to amplification culture, and expression of the single-point mutant T1 lipase was induced. After the induction culture was over, bacterial cells were collected and washed with a 20 mM phosphate buffer (pH 7.4) once to remove the remaining medium maximally. Then the bacterial cells were resuspended with this buffer. Cell disruption was performed using an ultrasonic disruptor (450 w, 5s/5s, 25 min). After disruption, the disruption solution was centrifuged at 4° C. (10,000 r·min$^{-1}$) for 1 h. The supernatant was collected and filtered with a 0.22 μm microporous filter to obtain a crude enzyme solution.

The crude enzyme solutions of 28 single-point mutant T1 lipases were purified using a nickel ion affinity column (1 mL His Trap FF) with Ni-NTA as a filler and an AKTA protein purifier. The purification steps were as follows: (1) Equilibration of columns: The columns were equilibrated with ultrapure water (20 column volumes), and then the columns were equilibrated with a binding solution with a final concentration of imidazole of 20 mM (20 column volumes). (2) Sample loading: The crude enzyme solutions were loaded at a flow rate of 1 mL/min by means of automatic sampling with a sampling pump. (3) Elution: First a buffer with a final concentration of imidazole of 20 mM was used for washing (10 column volumes) to remove some foreign proteins; then an eluent with a final concentration of imidazole of 500 mM was used for washing (30 column volumes); and the eluted products under the target peak pattern were collected and marked. (4) Column regeneration: Due to loss of nickel ions in the purification process, after purification, the nickel column was regenerated with a prepared regeneration solution to facilitate the next use. (5) SDS-PAGE verification and enzyme activity detection were performed on the purified enzyme solutions collected.

The enzyme activity was detected with p-nitrophenyl palmitate as a substrate, and an enzyme activity measuring system was 3 mL. The measuring steps were as follows: (1) 1.8 mL of a 50 mol·L$^{-1}$ Tris-HCl buffer was mixed with 100 μl of substrate, and the mixed solution was incubated at 37° C. for 10 min. (2) 100 μL of purified enzyme solution (diluted to a suitable concentration) was added to a sample tube, and 100 μL of the corresponding inactivated enzyme solution was added to a control tube. The solutions were mixed immediately and timing was performed for accurately reacting at 37° C. for 10 min. (3) 500 μL of 10% trichloroacetic acid was added to terminate the reaction. (4) 500 μL of 10% Na$_2$CO$_3$ solution was added to develop color, and the absorbance was measured at 405 nm.

Lipase activity calculation formula:

$$A = \frac{[(A_1 - A_0) \times k + C_0] \times V_1 \times N}{V_2 \times T}$$

A—Sample enzyme activity (U·mL$^{-1}$)
$A_1$—Absorbance OD value of sample enzyme solution
$A_0$—Blank absorbance OD value of corresponding enzyme solution
k—Slope of p-nitrophenol standard curve
$C_0$—Intercept of p-nitrophenol standard curve
N—Dilution factor $V_1$—Volume of reaction solution (mL)

$V_2$—Volume of enzyme solution (mL)

T-Reaction time (min)

Definition of lipase activity unit: Under certain temperature and pH conditions, the amount of enzyme required to hydrolyze the substrate to release 1 μmol of free fatty acid per minute is defined as one enzyme activity unit (U). In the disclosure, 1U refers to the amount of enzyme required for the wild-type and mutant T1 lipases to hydrolyze p-nitrophenyl palmitate to produce 1 μmol of free p-nitrobenzene per minute when the pH is 8.0 at 37° C.

The substrate p-nitrophenyl palmitate of a concentration of 0.1-10 mM was prepared. The kinetic parameters $k_m$, $k_{cat}$ and $k_{cat}/k_m$ of the single-point mutant were obtained by measuring the T1 lipase activity corresponding to different substrate concentrations, as shown in Table 2. The results showed that all single mutants exhibited catalytic activity, and the catalytic activity of 8 mutants increased, wherein the catalytic efficiency of A190Y, A186L, A190L, L188M, V187M, A186M, A190K and A190W increased by 59.07%, 73.05%, 50.60%, 45.77%, 16.58%, 43.78%, 17.88% and 22.68%, respectively. 28 mutants were screened out using the combination of two pieces of software FoldX and DynaMut, and the positive mutation rate was 28.57%. 12 mutants were screened out using the combination of three pieces of software FoldX, DynaMut and I-mutant 2.0, including six positive mutants A190Y, A186L, A190L, L188M, V187M and A186M, so the positive mutation rate was 50.00%. 8 mutants (A190L, A186L, L188M, A190Y, Q184I, Q184L, Q184M and V187M) were screened out using the combination of four pieces of software FoldX, DynaMut, I-mutant 2.0 and STRUM, including five positive mutants A190Y, A186L, A190L, L188M and V187M, so the positive mutation rate was 62.50%. 8 mutants were screened out using the combination of five pieces of software FoldX, DynaMut, I-mutant 2.0, STRUM and PoPMuSiC, including five positive mutants A190Y, A186L, A190L, L188M and V187M, so the positive mutation rate was 62.50%. Therefore, four pieces of software combined with calculation of free energy were preferred to screen mutants.

TABLE 2

Kinetic parameters of mutants

| Mutant | $K_m$ (mM) | $k_{cat}$ (s$^{-1} \cdot 10^7$) | $k_{cat}/K_m$ (s$^{-1} \cdot$ mM$^{-1} \cdot 10^7$) |
|---|---|---|---|
| wt-T1 | 0.26 ± 0.02 | 3.01 ± 0.07 | 11.58 |
| Q184I | 0.35 ± 0.07 | 3.03 ± 0.07 | 8.66 |
| Q184L | 0.33 ± 0.05 | 3.20 ± 0.09 | 9.70 |
| Q184M | 0.29 ± 0.06 | 2.72 ± 0.06 | 9.38 |
| Q184Y | 0.31 ± 0.02 | 2.51 ± 0.06 | 8.10 |
| Q184V | 0.34 ± 0.03 | 2.92 ± 0.06 | 8.59 |
| Q184F | 0.35 ± 0.06 | 2.85 ± 0.06 | 8.14 |
| A186L | 0.23 ± 0.03 | 4.61 ± 0.08 | 20.04 |
| A186K | 0.28 ± 0.05 | 3.02 ± 0.06 | 10.79 |
| A186R | 0.31 ± 0.07 | 2.47 ± 0.06 | 7.97 |
| A186Q | 0.40 ± 0.04 | 2.31 ± 0.06 | 5.78 |
| A186Y | 0.37 ± 0.03 | 3.04 ± 0.06 | 8.22 |
| A186M | 0.25 ± 0.05 | 4.17 ± 0.06 | 16.68 |
| A186F | 0.36 ± 0.03 | 2.95 ± 0.06 | 8.19 |
| A186W | 0.39 ± 0.04 | 2.84 ± 0.06 | 7.28 |
| V187F | 0.42 ± 0.03 | 2.51 ± 0.06 | 5.98 |
| V187L | 0.45 ± 0.05 | 2.69 ± 0.06 | 5.98 |
| V187Y | 0.37 ± 0.07 | 3.85 ± 0.06 | 10.41 |
| V187M | 0.26 ± 0.04 | 3.51 ± 0.12 | 13.50 |
| L188M | 0.25 ± 0.03 | 4.22 ± 0.11 | 16.88 |

TABLE 2-continued

Kinetic parameters of mutants

| Mutant | $K_m$ (mM) | $k_{cat}$ (s$^{-1} \cdot 10^7$) | $k_{cat}/K_m$ (s$^{-1} \cdot$ mM$^{-1} \cdot 10^7$) |
|---|---|---|---|
| A190L | 0.16 ± 0.04 | 2.79 ± 0.09 | 17.44 |
| A190Y | 0.24 ± 0.05 | 4.42 ± 0.10 | 18.42 |
| A190K | 0.25 ± 0.05 | 3.42 ± 0.06 | 13.68 |
| A190R | 0.31 ± 0.06 | 2.68 ± 0.06 | 8.65 |
| A190N | 0.33 ± 0.04 | 2.41 ± 0.06 | 7.30 |
| A190M | 0.28 ± 0.04 | 2.92 ± 0.06 | 10.42 |
| A190W | 0.26 ± 0.03 | 3.67 ± 0.06 | 14.12 |
| A190H | 0.37 ± 0.06 | 2.40 ± 0.06 | 6.49 |
| A190F | 0.38 ± 0.05 | 2.68 ± 0.06 | 7.05 |

The half unfolding temperature ($T_m$) and secondary structure of the wild-type T1 lipase and mutants were analyzed using an MOS-450 circular dichroic spectrometer purchased from Biologic, France. The samples were pretreated before the measurement, and impurity ions, mainly chloride ions, in the protein purification solution were removed maximally by overnight dialysis, in order to reduce the interference with the experimental results. After the dialysis, the concentration of the purified enzyme solution was measured by the Coomassie blue staining method, and then the purified enzyme solution was diluted to 0.01-0.1 mg/mL with a phosphate buffer of pH 7.4 according to the measured protein concentration. When the secondary structure of the sample was determined, the wavelength was set to 190-250 nm. When the half unfolding temperature ($T_m$) of the T1 lipase was measured, the temperature range was set to 20-90° C.

The specific enzyme activity and $T_m$ of 8 mutants screened by combining four pieces of free energy calculation software were measured. The results are shown in Table 3. The specific enzyme activity characterization results show that A190Y, A186L, A190L and L188M have higher specific enzyme activity than the wild-type T1 lipase (337 U/mg) at 65° C. and pH 8.0, increasing by 22.0%, 18.1%, 17.2%, and 11.9%, respectively. The specific activity of Q184I, Q184L and Q184M was lower, decreasing by 13.9%, 16.9%, and 11%, respectively. The specific activity of V187M was basically the same as that of the wild-type T1 lipase without significant change. Compared with the wild-type T1 lipase, the catalytic efficiency of A190Y, A186L, A190L, L188M and V187M increased by 59.07%, 73.06%, 50.60%, 45.77%, and 16.58%, respectively. The results of $T_m$ values of circular dichroism spectrum analysis show that the mutant with improved catalytic efficiency has also improved thermostability. The $T_m$ values of A190Y, A186L, A190L, L188M and V187M were 2.04° C., 3.64° C., 4.35° C., 4.94° C. and 1.43° C. higher than that of the wild-type T1 lipase respectively, increasing by 2.91%, 5.19%, 6.20%, 7.04% and 2.04%. The increase of $T_m$ value by percentage and the increase of $k_{cat}/k_m$ by percentage were added, that is, the increase of thermostability by percentage and the increase of catalytic efficiency by percentage were added to obtain the increase of robustness. Compared with the wild-type T1 lipase, the robustness of A190Y, A186L, A190L, L188M and V187M is improved by 61.98%, 78.25%, 56.80%, 52.81% and 18.62%, respectively.

TABLE 3

Specific enzyme activity, denaturation temperature and kinetic parameters of mutants

| Mutant | Specific enzyme activity (U/mg) | $T_m$ (° C.) | $K_m$ (mM) | $k_{cat}$ (s$^{-1}$ · 10$^7$) | $k_{cat}/K_m$ (s$^{-1}$ · mM$^{-1}$ · 10$^7$) |
|---|---|---|---|---|---|
| wt-T1 | 337 | 70.15 ± 0.21 | 0.26 ± 0.02 | 3.01 ± 0.07 | 11.58 |
| A190Y | 411 | 72.19 ± 0.22 | 0.24 ± 0.05 | 4.42 ± 0.10 | 18.42 |
| A186L | 398 | 73.79 ± 0.25 | 0.23 ± 0.03 | 4.61 ± 0.08 | 20.04 |
| A190L | 395 | 74.50 ± 0.11 | 0.16 ± 0.04 | 2.79 ± 0.09 | 17.44 |
| L188M | 377 | 75.09 ± 0.30 | 0.25 ± 0.03 | 4.22 ± 0.11 | 16.88 |
| Q184I | 290 | 65.93 ± 0.23 | 0.35 ± 0.07 | 3.03 ± 0.07 | 8.66 |
| Q184L | 280 | 69.06 ± 0.31 | 0.33 ± 0.05 | 3.20 ± 0.09 | 9.70 |
| Q184M | 300 | 67.34 ± 0.16 | 0.29 ± 0.06 | 2.72 ± 0.06 | 9.38 |
| V187M | 343 | 71.58 ± 0.28 | 0.26 ± 0.04 | 3.51 ± 0.12 | 13.50 |

Example 2: *Rhizomucor miehei* Lipase (RML Lipase, SEQ ID NO:2)

1. Screening of High Robustness Related Regions and Sites

The RML lipase crystal structure (PDB id: 4tgl) was downloaded from the Protein Data Bank as the research object. The downloaded crystal structure was modified and optimized by the Repair and Optimize programs in FoldX suite 5.0. MD simulation used the GROMACS 2019.03 installation package. In simulation, an AMBER99 force field was used, the protein was put into a cube box filled with water, and the shortest distance between the protein and the edge of the box was 1.0 nm. A water model used TIP4P, because the TIP4P model was one of the most reliable water models for studying pressure effects. Then 10 sodium ions were added for charge balancing. The system was minimized using the 50,000 step steepest descent method to ensure that the structure was normal, the interatomic distance was appropriate, and the geometric configuration was reasonable. Then, 400 ps NVT balancing was performed under periodic boundary conditions. The temperature was raised to 313 K using Berendsen temperature coupling, and atmospheric pressure was gradually increased to the expected high pressure (100 Bar, 500 Bar, 1,000 Bar, 2,000 Bar and 4,000 Bar) using Parrinell-Rahman pressure coupling. After the system was balanced, restrictions were eliminated and finished product simulation was performed. The entire simulation process used the Leap-frog algorithm to perform integration, and long-distance electrostatic potential energy was computed using the PME method. The limit constraint algorithm selected Lincs, and the precision was set to 1, 4. The cutoff method of proximity search was Verlet, and the search method was grid search because the grid search was much faster than the sample method. Finally, to ensure the repeatability and fairness of the results, all simulations were performed three times at different initial speeds with a duration of 30 ns. Root mean square deviation (RMSD), root mean square fluctuation (RMSF) and radius of gyration (Rg) of the protein and mutants thereof were all computed by GROMACS' own program. The secondary structure of the protein was computed by DSSP. The representative conformation was computed by gmx cluster, and the clustering method used was Gromos, wherein the rmsd_cutoff value was determined by the results of multiple calculations and selected as 0.11 nm. The RMSF calculation was mainly used to analyze the softness and flexibility of each amino acid in the protein. Different pressures had different effects on amino acids at different positions. Under the action of six pressures, $N^{227}S^{228}p^{229}E^{230}$ at the β-turn all presented a flexible region. However, as the pressure increased, the softness decreased. At 1,000 Bar, the softness increased. After 2,000 Bar, the softness decreased, and perhaps the pressure intensity reached a threshold at the time.

The B-factor of the crystal structure was computed using B-Fitter. The B-Factor values were sorted from highest to lowest, and the first 80 amino acids were selected as the target amino acids. Then the cavities of 4 representative conformations were computed using McVol, amino acids within 8 Å from the surfaces of the cavities were selected, and amino acids within 5 Å from the active sites were excluded to avoid sudden loss of enzyme activity due to mutations. The contribution rate of the amino acids was counted and computed. Amino acids with the contribution rate greater than 30% were selected. The same operation was performed under other pressures. Finally, 19 amino acid sites were selected.

2. Virtual Mutagenesis of Mutants with High Robustness, and Prediction of Stability of Virtual Mutants Using Multi-Scale Free Energy Calculation Virtual saturation mutagenesis was performed on the selected amino acids using FoldX, DynaMut, I-mutant 2.0 and STRUM respectively, and the free energy difference before and after the mutagenesis was computed. The mutants with lower free energy than the wild type were selected ($\Delta G_{mt}$-$\Delta G_{wt}$<0). Finally, Y20F, T21V, S24A, T149I and T198V with the lowest free energy in each amino acid mutant were selected (Ser27 and Arg197 with relatively small free energy difference of mutants were not selected) for the subsequent molecular dynamics simulation and experimental verification.

3. Preparation of Mutants and Characterization of Enzymatic Properties

The RML gene was derived from the wild pro-RML gene (Genbank accession number: No. KP164599, see the sequence table for the amino acid sequence). According to the primer pairs designed in Table 4, and using the constructed recombinant plasmid PET-28a-wtRML as a template, mutants were constructed using the site-directed Fast Mutagenesis Kit V2. The reaction system was 50 µL, including: dd H$_2$O, 18 µL; 2×Max Buffer, 25 µL; dNTP Mix (10 mM Each), 1 µL; template DNA, 1 µL; forward and reverse primers, 2 µL each; and Phanta Max Super-Fidelity DNA Polymerase, 1 µL. The amplification reaction conditions for mutant construction were: 95° C., 30 s; 95° C., 15 s; 68° C., 15 s; 72° C., 5 min, 30 cycles; and 72° C., 5 min. After the amplification, the amplified product was digested at 37° C. for 1-2 h with the Dpn I digestive enzyme. The digested product was taken for performing transformation, plate coating and cloning identification. Generally, 10 µL of the digested product was transformed to 100 µL of competent cells *E. coli* JM109. Single colonies were selected and cultured in an LB liquid medium containing kanamycin in a shake flask at 37° C. for 8-10 h. The single colonies were preliminarily verified by PCR of the bacterial solution. The verification system was 25 µL, including: dd H$_2$O, 9.5 µL; forward and reverse primers, 1 µL each; bacterial solution, 1 µL; and Taq PCR master mix 2×, blue, 12.5 µL. The reaction conditions were: 95° C., 3 min; 95° C., 45 s; 55° C., 30 s; 72° C., 1 min, 39 cycles; and 72° C., 7 min. The amplified product was further verified by nucleic acid gel electrophoresis, and the fresh bacterial solution containing the target band in the PCR product was sent to Genewiz Biotechnology Co., Ltd. for performing Sanger sequencing as the final verification.

TABLE 4

PCR primers

| Mutant | Primer | | |
|---|---|---|---|
| Y20F | Forward: | 5'-GAACTGACCTACTTCACCCTGTCTGCGAAC-3' | (SEQ ID NO: 60) |
|  | Reverse: | 5'-CAGGGTGAAGTAGGTCAGTTCGTTGATTTC-3' | (SEQ ID NO: 61) |
| T21V | Forward: | 5'-CTGACCTACTATGTGACCCTGTCTGCGAACAGC-3' | (SEQ ID NO: 62) |
|  | Reverse: | 5'-AGACAGGGTCACATAGTAGGTCAGTTCGTTGAT-3' | (SEQ ID NO: 63) |
| S24A | Forward: | 5'-TATACCACCCTGGCCGCGAACAGCTACTGCCGT-3' | (SEQ ID NO: 64) |
|  | Reverse: | 5'-GCTGTTCGCGGCCAGGGTGGTATAGTAGGTCAG-3' | (SEQ ID NO: 65) |
| T149I | Forward: | 5'-CTGGGTGGTGCGATCGCTCTGCTGTGCGCGCTG-3' | (SEQ ID NO: 66) |
|  | Reverse: | 5'-CAGCAGAGCGATCGCACCACCCAGAGAGTGGCC-3' | (SEQ ID NO: 67) |
| T198V | Forward: | 5'-CCGTACCGTCGTGTCGTTAACGAACGTGATATC-3' | (SEQ ID NO: 68) |
|  | Reverse: | 5'-TTCGTTAACGACACGACGGTACGGGATACCGGT-3' | (SEQ ID NO: 69) |

The mutants verified successful by sequencing were subjected to amplification culture, and the plasmids were extracted and then introduced into the expression host *E. coli* BL21 for performing expression. The induction expression conditions were: 16° C., 200 r·min$^{-1}$, an IPTG final concentration of 0.5 mM, and induction for 12-16 h. After induction, bacterial cells were collected by centrifugation and resuspended and disrupted in a phosphate buffer of pH 7.4. The disruption solution was centrifuged at 10,000 r·min$^{-1}$ for 1 h. Since the enzyme is a soluble intracellular protein, the supernatant was collected as the crude enzyme solution. The vector pET-28a used in the experiment had a His tag, so the crude enzyme solution was purified using the principle of nickel ion affinity chromatography. Before purification, the crude enzyme solution was filtered with a 0.22 μM aqueous filter. The nickel column used for purification was 1 mL His Trap FF, and the purification instrument used the AKATA protein purification instrument. The purification method was as follows: the loading amount was 15 mL; first, 20 mM imidazole eluent was used for washing for 10 column volumes, and then 500 mM imidazole eluent was used for linearly eluting for 25 column volumes; and finally, 500 mM imidazole eluent was used for washing for 10 column volumes to completely remove residual protein from the column.

The enzyme activity was measured with p-nitrophenyl palmitate (P-Npp) as the substrate in the experiment. The specific process was as follows: Two test tubes, respectively a control tube and a sample tube, were taken. 1.8 mL of 50 mM Tris-HCl of pH 8.0 and 0.1 mL of substrate solution were added to the two test tubes, respectively, and the two test tubes were put in a water bath at 37° C. for 5 min. 0.1 mL of inactivated enzyme solution was added to the control tube, and 0.1 ml of enzyme solution to be tested was added to the sample tube. The solutions were uniformly mixed immediately and timing was performed for accurately reacting for 10 min. 0.5 mL of 10% of trichloroacetic acid solution was added to terminate the reaction. Then 0.5 mL of 10% sodium carbonate solution was added to develop color, and the absorbance value was measured at 410 nm with a microplate reader. In the study, 1U refers to the amount of enzyme required for the wild-type and mutant RML lipases to hydrolyze p-nitrophenyl palmitate to produce 1 μmol of free p-nitrobenzene per minute when the pH is 8.0 at 37° C. The characterization results of specific enzyme activity (Table 5) show that the enzyme activity of T21V, S24A, T149I and T198V was significantly increased compared with that of the wild type, respectively increased by 91.76%, 38.30%, 35.37% and 10.90%, wherein the uptrend of the enzyme activity of T21V was the most significant. The catalytic efficiency of T21V, T149I and T198V was increased by 36.58%, 56.24% and 11.37% respectively compared with that of the wild type.

The purified enzyme solution was dialyzed overnight in a phosphate buffer solution of pH 7.4 to remove chloride ions from the enzyme solution and prevent interference with the measurement results of the unfolding temperature value. The dialyzed enzyme solution was diluted to a concentration of 0.01-0.1 mg·mL$^{-1}$. The unfolding temperature ($T_m$) of the sample was measured using a circular dichrograph, and the temperature gradient was set to 20-100° C. A phosphate buffer was used as a blank control. As shown in Table 5, the $T_m$ values of the wild type RML, Y20F, T21V, S24A, T149I and T198V were 59.25° C., 55.74° C., 65.76° C., 58.64° C., 61.32° C. and 63.42° C., respectively, the $T_m$ values of the mutants T21V, T149I and T198V were 6.51° C., 2.07° C. and 4.17° C. higher than that of the wild type, respectively, and the thermostability was improved. The robustness (catalytic activity and thermostability) were increased by 47.57%, 59.73% and 18.41%, respectively.

TABLE 5

Specific enzyme activity, denaturation temperature and kinetic parameters of wild type and mutants

|  | Specific enzyme activity (U/mg) | $T_m$ (° C.) | $K_m$ (mM) | $K_{cat}$ (s$^{-1}$) | $K_{cat}/K_m$ (s$^{-1}$ · mM$^{-1}$) |
|---|---|---|---|---|---|
| WT | 376 | 59.25 | 1.22 ± 0.13 | 26.18 ± 1.22 | 21.46 |
| Y20F | 251 | 55.74 | 1.43 ± 0.18 | 25.45 ± 1.30 | 17.80 |
| T21V | 718 | 65.76 | 1.08 ± 0.15 | 31.65 ± 1.07 | 29.31 |
| S24A | 520 | 58.64 | 1.52 ± 0.16 | 28.09 ± 1.49 | 18.48 |
| T149I | 509 | 61.32 | 0.98 ± 0.09 | 32.86 ± 1.15 | 33.53 |
| T198V | 417 | 63.42 | 1.25 ± 0.11 | 29.88 ± 1.52 | 23.90 |

Example 3: Urethanase

1. Screening of High Robustness Related Regions and Sites

Templates with higher homology in the PDB database were used for performing modeling, respectively. Glutamyl-tRNA (Gln) amidotransferase subunit A (PDB ID: 2G5H)

with the highest coverage, less gap, highest comprehensive score, and the third homology (37.58%) was selected as a template. Three-dimensional structure modeling was performed on urethanase (EC 3.5.1.75, Urethanase, see the sequence table for the amino acid sequence (SEQ ID NO:3), derived from *Lysinibacillus fusiformis* SC02) using an online three-dimensional structure simulation program SWISS-MODEL (swissmodel.expasy.org/interactive). Under the pressure of 1 Bar, 100 Bar, 500 Bar, 1,000 Bar, 2,000 Bar and 4,000 Bar, and a temperature condition of 313K, molecular dynamics simulation was performed on urethanase (UH) to find structures or regions related to the instability of enzyme molecules. Analysis of the B-factor value of each amino acid of the UH protein by FlexServ software showed that the B-factor response value at position Leu327 in the sequence was the highest, indicating that the structure of this part was unstable and the degree of irregularity was large. The RMSF value of each amino acid in the UH was predicted using the molecular dynamics software Gromacs, and the results showed that the most unstable region was near the 327 amino acid. The six amino acids with the highest RMSF values were Ser325, Asp326, Leu327, Gln328, Lys329 and Arg330.

2. Virtual Mutagenesis and Screening by Multi-Scale Free Energy Calculation

Virtual saturation mutagenesis was performed on the six amino acid sites. The stability of the mutants was further predicted using FoldX, STRUM, I-mutant 2.0 and DynaMut. The intersection of the prediction results was selected, and finally, four mutants L327A, L327Y, L327C and L327V with robustness assumed to be improved were obtained.

3. Preparation of Mutants and Characterization of Enzymatic Properties

Using the recombinant plasmid pET20b-UH as a template, four mutants of UH at position 327 were obtained by full plasmid PCR amplification (the primer sequences are shown in Table 6). The mutants were respectively induced to express and purified, and pure enzymes with relatively high purity of the UH mutants were obtained.

TABLE 6

Primers

| Mutant | Primer |
|---|---|
| L327-R | TAAATCTGAATGGTGTATAGCTGCTG (SEQ ID NO: 70) |
| L327-F | CTGAAGAGACCACAAGATTTTGGTG (SEQ ID NO: 71) |
| L327A-F | GCAAAGAGACCACAAGATTTTGGTG (SEQ ID NO: 72) |
| L327Y-F | TATAAGAGACCACAAGATTTTGGTG (SEQ ID NO: 73) |
| L327C-F | TGTAAGAGACCACAAGATTTTGGTG (SEQ ID NO: 74) |
| L327V-F | GTTAAGAGACCACAAGATTTTGGTG (SEQ ID NO: 75) |

The urethanase activity was computed by a method of measuring the production of product ammonia. 1 mL of enzyme solution (ultrapure water was used as control) was taken and added to 1 mL of 3% EC solution. After the mixed solution reacted in a constant temperature water box at 37° C. for 15 min, 1 mL of 10% trichloroacetic acid was added to terminate the reaction. After the reaction was terminated, 1 ml of developer I (15 g of phenol and 0.625 g of sodium nitroferricyanide made up to a volume of 250 ml) and 1 mL of developer II (13.125 g of NaOH and 7.5 mL of sodium hypochlorite made up to a volume of 250 mL) were added. The mixed solution was uniformly mixed and incubated in a water box at 37° C. for 20 min. After the reaction, the volume was made up with ultrapure water to 10 mL, and the absorbance at 625 nm was measured. Definition of enzyme activity: The amount of enzyme required to decompose EC to produce 1 μmol of ammonia in 1 min at atmospheric pressure, 37° C. and pH 7.0 is 1 enzyme activity unit (U). From Table 7, it can be seen that the specific enzyme activity of the mutants L327A, L327Y, L327C and L327V was increased by 2.83%, 25.04%, 8.50% and 22.58% respectively compared with that of the wild type.

The half unfolding temperature ($T_m$) of the wild-type UH and mutants were analyzed using an MOS-450 circular dichroic spectrometer purchased from Biologic, France. From Table 7, it can be seen that the $T_m$ values of the mutants L327A, L327Y, L327C and L327V were increased by 2.21° C., 7.66° C., 9.37° C. and 6.96° C. respectively compared with that of the wild type, and the thermostability was improved.

Using 5-300 mM urethane as a substrate, the reaction rate of the enzyme under the corresponding concentration condition was measured. According to the relation between the substrate concentration and the reaction rate (Table 7), the values of kinetic constants $k_m$ and $k_{cat}$ were obtained. Through site-directed mutagenesis, the catalytic efficiency of the mutants L327A, L327Y, L327R and L327V were increased by 35.42%, 64.25%, 46.62% and 38.55%, respectively; and the robustness was increased by 39.36%, 77.90%, 63.31% and 50.95%, respectively.

TABLE 7

Specific enzyme activity, denaturation temperature and kinetic parameters of wild type and mutants

| Mutants | Specific enzyme activity (U/mg) | Tm (° C.) | $K_m$ (mM) | $K_{cat}$ (s$^{-1}$) | $K_{cat}/K_m$ (s$^{-1}$ · mM$^{-1}$) |
|---|---|---|---|---|---|
| UH | 109.4 | 56.13 ± 0.17 | 53.15 ± 1.65 | 645.17 ± 15.67 | 12.14 |
| L327A | 112.5 | 58.31 ± 0.21 | 50.87 ± 2.41 | 836.24 ± 12.51 | 16.44 |
| L327Y | 136.8 | 63.79 ± 0.19 | 44.68 ± 4.65 | 890.83 ± 18.63 | 19.94 |
| L327R | 118.7 | 65.50 ± 0.13 | 56.21 ± 3.74 | 1000.65 ± 20.58 | 17.80 |
| L327V | 134.1 | 63.09 ± 0.22 | 57.97 ± 2.95 | 975.20 ± 29.14 | 16.82 |

What is claimed is:

1. A method for screening hydrolases with improved robustness, comprising:
   (a) screening out key regions closely related to a function of hydrolases by combining high-pressure disturbance and molecular dynamics model simulation;
   (b) performing virtual saturation mutagenesis on amino acids in the key regions, wherein the virtual saturation mutagenesis comprises mutating a single residue to 19 other amino acids via software inputs to generate various mutants;
   (c) predicting stability of the mutants with multi-scale free energy calculation software, which comprises:
      performing multi-scale free energy calculations using FoldX™, I-mutant 2.0™, STRUM™, DynaMut™ and PopMuSiC™ software,
      selecting an intersection of positive mutants in prediction results of the above software, and
      performing a verification experiment;
   (d) screening out mutants with high robustness, which comprises: expressing the mutants in the intersection obtained in step (c) by employing genetically engineered bacteria via the following steps:
      (A) introducing the screened mutation into a target protein:
      (B) performing reverse polymerase chain reaction (PCR) with a recombinant plasmid comprising a hydrolase gene and an oligonucleotide sequence with mutation sites as a primer;
      (C) amplifying a full length of a mutant plasmid,
      (D) performing digestion using Dpn I restriction endonuclease,
      (E) transforming a digested product into *Escherichia coli* (*E. coli*) JM109;
      (F) screening the *E. coli* JM109 with the digested plasmid successfully transformed and performing amplification culture;
      (G) extracting the recombinant plasmid from the culture, and
      (H) transforming the recombinant plasmid into *E. coli* or yeast to induce expression to obtain a protein with single-point mutation;
      (I) purifying the protein with a single-point mutation by employing a nickel ion affinity chromatography column with Ni-NTA as a filler, or, ion exchange chromatography, to purify the protein with a single-point mutation enzyme from the culture of *E. coli* or yeast with the aid of an AKTA purifier;
      (J) dialyzing the purified enzyme;
      (K) diluting the dialyzed enzyme solution to a concentration of 0.01 to 0.1 mg per-mL;
      (L) measuring an unfolding temperature ($T_m$) of a sample using a circular dichrograph; and
      (M) setting a temperature gradient of 20° C. to 100° C.;
   (e) analyzing and characterizing enzymatic properties;
   wherein the mutations are introduced using a site-directed mutagenesis technology into the mutants in the intersection of the positive mutants selected in step (c),
   wherein the mutants are expressed using the genetically engineered bacteria;
   wherein enzyme activity of a separated and purified enzyme is measured and analyzed by a circular dichroism spectrum, and
   wherein the hydrolases comprise lipase and urethanase.

2. The method according to claim 1, wherein in step (a), a crystal structure of a hydrolase is an initial model,
   performing molecular dynamics simulation or Monte Carlo simulation under a pressure range of 0 Bar to 20,000 Bar;
   determining by computing and analyzing change trends of B-Factor, root mean square deviation, radius of gyration, and root mean square fluctuation, the key regions closely related to the function of hydrolases;
   locating the key regions where amino acid residues with highest B-factor, root mean square deviation, and root mean square fluctuation values; and
   employing one or more tools that can be used for the molecular dynamics simulation selected from the group consisting of Gromacs™, AMBER™ and NAMD™.

3. The method according to claim 1, wherein in step (c), multi-scale free energy calculations are calculations from multiple perspectives of protein dynamics, protein thermodynamics, and prediction algorithms; and
   wherein a positive mutant is a mutant the free energy of which after mutation is less than the free energy before mutation.

* * * * *